US011736640B1

(12) United States Patent
Shin

(10) Patent No.: US 11,736,640 B1
(45) Date of Patent: Aug. 22, 2023

(54) METHOD AND APPARATUS FOR DETECTING SHEET-FED SCANNER DOUBLE-FEEDS USING NEURAL NETWORK CLASSIFIER

(71) Applicant: KYOCERA Document Solutions, Inc., Osaka (JP)

(72) Inventor: Kilho Shin, Torrance, CA (US)

(73) Assignee: KYOCERA DOCUMENT SOLUTIONS, INC., Osaka (JP)

( * ) Notice: Subject to any disclaimer, the term of this patent is extended or adjusted under 35 U.S.C. 154(b) by 0 days.

(21) Appl. No.: 17/821,450

(22) Filed: Aug. 22, 2022

(51) Int. Cl.
*H04N 1/00* (2006.01)
*G06T 7/00* (2017.01)

(52) U.S. Cl.
CPC ....... *H04N 1/00689* (2013.01); *G06T 7/0002* (2013.01); *H04N 1/00734* (2013.01); *H04N 1/00774* (2013.01); *G06T 2207/20081* (2013.01); *G06T 2207/20084* (2013.01); *G06T 2207/30144* (2013.01); *H04N 2201/0094* (2013.01)

(58) Field of Classification Search
CPC ......... G06F 16/40; G06F 16/434; G06K 1/12; G06K 19/06037; G06K 2019/06225; G09B 5/062; G11B 7/0033; G11B 7/013; H04N 1/00326; H04N 1/2104; H04N 1/2162; H04N 1/32133; H04N 1/32144; H04N 2201/3225; H04N 2201/3261; H04N 2201/3264; H04N 2201/3269; H04N 2201/3271; H04N 2201/3274; H04N 2201/3277; G03G 15/5058; G03G 15/5079; G03G 15/55
USPC .......................................... 358/475; 382/275
See application file for complete search history.

(56) References Cited

U.S. PATENT DOCUMENTS

| | | | | |
|---|---|---|---|---|
| 5,578,813 A * | 11/1996 | Allen | ...................... | H04N 1/047 250/556 |
| 5,652,830 A * | 7/1997 | Yamamoto | ......... | H04N 1/32358 358/1.14 |
| 7,654,522 B2 * | 2/2010 | Tonami | .................. | B65H 7/125 271/262 |
| 8,600,196 B2 * | 12/2013 | King | ...................... | G06Q 30/00 382/313 |
| 8,867,796 B2 * | 10/2014 | Vans | .................. | H04N 1/00029 358/1.9 |
| 2001/0042956 A1 * | 11/2001 | Minoru | .................. | B65H 7/125 271/265.04 |

(Continued)

*Primary Examiner* — Negussie Worku
(74) *Attorney, Agent, or Firm* — Rowan TELS LLC

(57) ABSTRACT

Methods and system are disclosed for a double-feed detector with neural network classifier. These includes accepting pages of a print-based media substrate into a scanning device with a paper feed device, back-illuminating the pages using a light source, capturing a page image of back-illuminated pages using an image capture device, detecting noise patterns exhibited by the page image using an image processor, classifying detected noise patterns using a noise pattern classifier, and determining, using classified detected noise patterns and a neural network controller for a neural network model, whether the at least one page is a sheet stack (at least two pages stacked together and passing through the paper feed device concurrently) based on the classified detected noise patterns. On condition a sheet stack is detected, a sheet stack detected signal triggers taking an action.

20 Claims, 15 Drawing Sheets

(56) References Cited

U.S. PATENT DOCUMENTS

| | | | | |
|---|---|---|---|---|
| 2005/0275162 | A1* | 12/2005 | Sano | B65H 7/125 |
| | | | | 271/291 |
| 2006/0256215 | A1* | 11/2006 | Zhang | H04N 25/63 |
| | | | | 348/E5.081 |
| 2006/0256607 | A1* | 11/2006 | Jeon | G11C 11/22 |
| | | | | 365/145 |
| 2008/0056607 | A1* | 3/2008 | Ovsiannikov | G06T 5/002 |
| | | | | 348/E5.078 |
| 2013/0155434 | A1* | 6/2013 | Kneezel | H04N 1/2323 |
| | | | | 358/1.13 |
| 2020/0307935 | A1* | 10/2020 | Nonoyama | B65H 7/14 |
| 2021/0241447 | A1* | 8/2021 | Kambegawa | G06V 10/993 |

* cited by examiner

METHOD AND APPARATUS FOR DETECTING SHEET-FED SCANNER DOUBLE-FEEDS USING NEURAL NETWORK CLASSIFIER

BACKGROUND

When a paper is transported through a feeder-like paper feeding device in a photo scanner, two or more papers may be fed accidentally. In conventional solutions, double-feed papers may be detected via an ultrasonic transmitter and receiver by calculating a signal strength. However, the ultrasonic device causes additional costs for manufacturing a photo scanner or Multifunction printer (MFP).

There is a need for a solution that detects double-feed papers using software, without incorporating additional hardware, and thus additional costs, in the design and manufacture of a photo scanner, MFP, or similar device.

BRIEF SUMMARY

In one aspect, a method is disclosed that includes accepting at least one page of a print-based media substrate into a scanning device including a paper feed device. The method also includes back-illuminating the at least one page using a light source. The method also includes capturing a page image of the at least one page during back illumination using an image capture device. The method also includes detecting noise patterns exhibited by the page image using an image processor. The method also includes classifying detected noise patterns from the image processor using a noise pattern classifier. The method also includes determining, using classified detected noise patterns and a neural network controller for a neural network model, whether the at least one page is a sheet stack based on the classified detected noise patterns, where the sheet stack includes at least a front sheet and a back sheet stacked together and traversing the paper feed device concurrently, the front sheet obscuring printed content on the back sheet. On condition the neural network controller determines the at least one page is the sheet stack, the method also includes transmitting a sheet stack detected signal from the neural network controller to the scanning device, and taking an action in view of the presence of the sheet stack detected signal.

In one aspect, a method is disclosed that includes compiling a dataset of pages includes single sheets, where the single sheets include at least one of single-sided single sheets printed on one side and double-sided single sheets printed on both sides, and sheet stacks, where the sheet stacks each comprise at least a front sheet and a back sheet stacked together to be fed to a paper feed device concurrently, the front sheet obscuring printed content on the back sheet, where the single sheets and the sheet stacks are randomly distributed among the dataset of pages. The method also includes feeding the dataset of pages to the paper feed device, where the paper feed device is connected to a light source, an image capture device, and a neural network controller. The method also includes back-illuminating each of the dataset of pages using the light source. The method also includes capturing a page image of each of the dataset of pages during back illumination using the image capture device. The method also includes detecting page properties exhibited by each of the dataset of pages using the neural network controller. The method also includes predicting, using the neural network controller, whether each of the dataset of pages is one of the single sheets or one of the sheet stacks based on the page properties. The method also includes calculating a prediction loss using a cross-entropy loss function. The method also includes back-propagating the prediction loss to the neural network controller to train the neural network controller to minimize the prediction loss.

In one aspect, a computing apparatus is disclosed that includes a scanning device including a paper feed device. The computing apparatus also includes a light source. The computing apparatus also includes an image capture device. The computing apparatus also includes a neural network controller. The computing apparatus also includes a memory storing instructions that, when executed by the processor, configure the apparatus to accept at least one page of a print-based media substrate into the scanning device including the paper feed device. The computing apparatus also includes a memory storing instructions that, when executed by the processor, configure the apparatus to back-illuminate the at least one page using the light source. The computing apparatus also includes a memory storing instructions that, when executed by the processor, configure the apparatus to capture a page image of the at least one page during back illumination using the image capture device. The computing apparatus also includes a memory storing instructions that, when executed by the processor, configure the apparatus to detect noise patterns exhibited by the page image using an image processor. The computing apparatus also includes a memory storing instructions that, when executed by the processor, configure the apparatus to classify detected noise patterns from the image processor using a noise pattern classifier. The computing apparatus also includes a memory storing instructions that, when executed by the processor, configure the apparatus to determine, using classified detected noise patterns and the neural network controller for a neural network model, whether the at least one page is a sheet stack based on the classified detected noise patterns, where the sheet stack includes at least a front sheet and a back sheet stacked together and traversing the paper feed device concurrently, the front sheet obscuring printed content on the back sheet. The computing apparatus also includes a memory storing instructions that, when executed by the processor, configure the apparatus to, on condition the neural network controller determines the at least one page is the sheet stack, transmit a sheet stack detected signal from the neural network controller to the scanning device, and take an action in view of the presence of the sheet stack detected signal.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
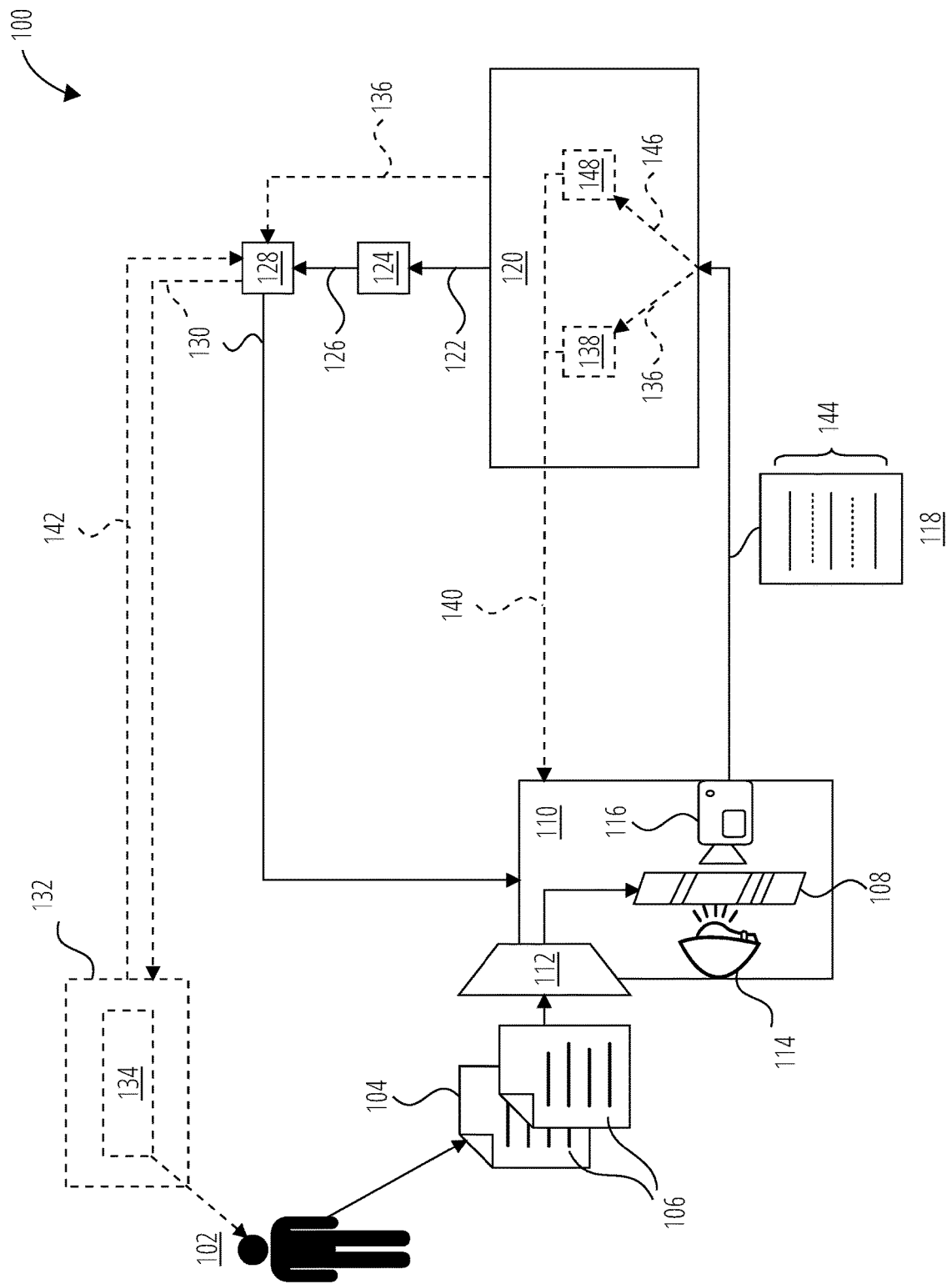
FIG. 1 illustrates a computing apparatus 100 in accordance with one embodiment.

Two overlapped sheets of printed paper, seen through strong light, may be easily detected as overlapped, visually, because blurred or faint noise from the back page may be visible on the front page. This has been applied to create the disclosed double-feed detector solution, using a deep learning network. When double-feed papers (sheet stacks) are scanned, scanned images for sheet stacks may be differ from single pages due to the strong light in the scanner. There may be some noise from the overlapped paper due to the strong light used to scan the paper.

Noise patterns generated by a light source are different between double-feed paper and single-feed paper with regard to 1) light intensity, and 2) overlapping paragraph pattern. For the first noise pattern distinction, the light intensity coming through a single sheet is brighter than the intensity coming through a sheet stack (two or more papers). The weaker light intensity coming through multiple papers may be decoded as darker gray red/green/blue (RGB) values. For the second distinction, the overlapping paragraph pattern indicates whether a single sheet or a sheet stack are fed through a feeder of a scanner. Because a paragraph is usually not overlapped in a document, if a paragraph is overlapped by other paragraphs, it may be a strong indication that a sheet stack has been fed.

On technical complexity that arises is that a double-sided single sheet, or one piece of paper with printing on both sides, may also exhibit noise from overlapping paragraph patterns. However, the configuration of overlapped paragraphs generated by double-sided paper and double-fed papers differ in that paragraphs of most single-sided single sheets and sheet stacks are left-aligned, while the overall alignment patterns of overlapped paragraphs of double-sided paper would be left- and right-aligned, and this alignment difference may be detectable in the resulting noise patterns. Taken together, the differences in noise patterns of light intensity and overlapping paragraph patterns may be detected by the solution disclosed herein, and may thus be used to determine whether multi-fed occurs or not, using hardware already present in most devices that would implement such a solution.

Convolutional neural network (CNN) is a deep learning model which outperforms many other models in learning global features of an image and classifying those features into several categories. Unlike conventional computer vision, a CNN-like network model may be gradually tuned to store the global features of a given image to mimic how the human visual perception works. Thus, the global features difference between single and overlapped scanned images may be easily classified by the CNN-like network model.

Image classification is the task of taking an input image and outputting a class (a cat, dog, etc) or a probability of classes that best describes the image. CNNs are particularly well suited to classifying features in data sets modelled in two or three dimensions. This makes CNNs popular for image classification, because images may be represented in computer memories in three dimensions (two dimensions for width and height, and a third dimension for pixel features like color components and intensity). For example a color JPEG image of size 480×480 pixels may be modelled in computer memory using an array that is 480×480×3, where each of the values of the third dimension is a red, green, or blue color component intensity for the pixel ranging from 0 to 255. Inputting this array of numbers to a trained CNN will generate outputs that describe the probability of the image being a certain class (0.80 for cat, 0.15 for dog, 0.05 for bird, etc). Fundamentally, CNNs input the data set, pass it through a series of convolutional transformations, nonlinear activation functions, such as Rectified Linear Units (RELU), and pooling operations (downsampling, e.g., maxpool), and an output layer (e.g., softmax) to generate the classifications.

Operation Overview

Deep Learning Model for the Double Feed Detector

Classification deep learning model with a CNN architecture, such as VGG, Inception, Resnet or XceptionNet may be a suitable base architecture in one embodiment of the present disclosure. These classification models perform well to detect overall noise features of the image and classify the image into an identified classification category.

Dataset Generation and Labeling

A supervised learning scheme may be used for this training in one embodiment, because supervised learning based on its greater efficiency compared to unsupervised learning methods. The dataset may be generated with two categories (labels): 1) no overlap image (single sheet) and 2) overlapped images (sheet stack).

Training and Validation

A CNN architecture may be chosen for the double-feed detector model. A cross-validation scheme may be used to train and validate the model. Thus, the dataset may be split into two groups, and the training dataset may be batched and fed to the model for training. Later, the validation dataset may be fed to validate the model's accuracy. Model weights may be tuned via a backpropagation training scheme.

Deploy to a Target and Usage

The trained model may be mapped to layers that are supported by the target (photo scanner or MFP) device.

FIG. 1 illustrates a computing apparatus 100 in accordance with one embodiment. The computing apparatus 100 comprises a user 102, a print-based media substrate 104, a printed content 106, a page 108, a scanning device 110, a paper feed device 112, a light source 114, an image capture device 116, a page image 118, an image processor 120, detected noise patterns 122, a noise pattern classifier 124, classified detected noise patterns 126, a neural network controller 128, a sheet stack detected signal 130, a user interface 132, a sheet stack alert 134, a measured page luminance 136, a reference page luminance 138, a no sheet stack detected signal 140, a filter 148, a feedback 142, and a pixels 146.

The user 102 may insert print-based media substrate 104 into a paper feed device 112 incorporated into a scanning device 110 or MFP. The print-based media substrate 104 may comprise printed content 106. The printed content 106 may be a number of sheets of paper stock that have previously been printed with textual, numerical, graphical, or otherwise visually represented information. The print-based media substrate 104 may be of various materials, such as paper, plastic, parchment, and other materials suitable for printing. The printed content 106 may be created by depositing various materials such as black and colored inks and toners, or may be portions of the print-based media substrate 104 darkened by application of heat, laser, chemicals, or some other process.

The paper feed device 112 may be configured to accept and hold many sheets of print-based media substrate 104, and engage one sheet of print-based media substrate 104, such as the top-most sheet of print-based media substrate 104, at a time, using friction, pressure, gripping, or some other manner of engagement, to pull one page 108 of print-based media substrate 104 at a time into the inner active regions of the machine, leaving any remaining pages held within a paper feed device 112 page receptacle area. However, in some instances, more than a single top-most page 108 may be engaged, when pages 108 of the print-based media substrate 104 adhere to each other with more force than may be overcome by the friction or other engaging action of the paper feed device 112.

The scanning device 110 may move an engaged page 108 (or pages 108) from the paper feed device 112 to an area between a light source 114 and an image capture device 116. The light source 114 may be an incandescent bulb, one or more light emitting diodes (LEDs), or other sources of light as are well understood by those skilled in the art. At this portion of the scanning device 110, the light source 114 may provide back-illumination as the image capture device 116 captures a digital page image 118 of the page 108 or pages 108. The image capture device 116 may be a digital camera configured with shutter and lens or analogous elements, or other scanning and sensing hardware capable of translating sensed incident light into digital data to form a page image, as are well understood by those skilled in the art. The scanning device 110 may send the page image 118 to the image processor 120. In one embodiment, the image processor 120 may detect a noise pattern and may send detected noise patterns 122 to a noise pattern classifier 124.

The noise pattern classifier 124 may classify the detected noise patterns 122 based on features such as page luminance and left paragraph alignment patterns and right paragraph alignment patterns. The noise pattern classifier 124 may send the classified detected noise patterns 126 to a neural network controller 128. In one embodiment, the noise pattern classifier 124 and neural network controller 128 may be incorporated, one or both, within the image processor 120. In another embodiment, each may reside on a dedicated processing chip, or any combination thereof.

When the classified detected noise patterns 126 are classified as indicating a sheet stack (more than one page 108 of print-based media substrate 104 containing printed content 106 running through the scanning device 110 at the same time), the neural network controller 128 may send a sheet stack detected signal 130 to at least the scanning device 110. Other action may be taken when the sheet stack detected signal 130 is generated and received. In one embodiment, the scanning device 110 may halt operation upon receiving the sheet stack detected signal 130.

In one embodiment, the computing apparatus 100 may include a user interface 132 capable of displaying information to the user 102. The neural network controller 128 may send the sheet stack detected signal 130 to the user interface 132. In response to receiving the sheet stack detected signal 130, the user interface 132 may display a sheet stack alert 134 to the user 102. In one embodiment, the user 102 may be able to examine the page 108 and indicate whether or not it is a sheet stack. In one embodiment, the user interface 132 may allow the user to provide feedback 142 to the neural network controller 128. This feedback 142 may be used by the neural network controller 128 to improve its classification capabilities. Other actions may be taken upon generation and receipt of a sheet stack detected signal 130, including but not limited to creating a digital record indicating the presence of the sheet stack detected signal 130 and physically marking the location of the sheet stack.

In one embodiment, the image processor 120 may use a reference page luminance 138 to analyze the measured page luminance 136 detected from the page image 118. In one embodiment, the page image 118 may be analyzed for noise patterns 144. The image processor 120 may analyze the pixels 146 of a page image 118 using a filter 148. The filter 148 may be a high pass filter, a low pass filter, a band pass filter, or combinations thereof, depending on the desired results. For example a low pass filter may filter pixels of high luminosity, such that pixels representing unprinted portions of the print-based media substrate 104 are omitted from further analysis. In one embodiment, the filter 148 may be a band pass filter, omitting the highest and lowest luminosity pixels, which may be considered to represent unprinted print-based media substrate (highest luminosity) and printed content 106 on the front of the print-based media substrate 104 (lowest luminosity), both of which might indicate a front sheet of print-based media substrate 104, and which may not provide information indicative of a sheet stack.

Through analysis of filtered pixels, the image processor 120 may determine that the page image 118 does not indicate a sheet stack. The image processor 120 may then send a no sheet stack detected signal 140 to the scanning device 110. The scanning device 110 may take an action such as moving the current page 108 along to the next portions of the machine, and taking another page 108 from the paper feed device 112 to image. In one embodiment, the image processor 120 may send the measured page luminance 136 to the neural network controller 128, and the neural network controller 128 may use the measured page luminance 136 as part of its determination on the present page image 118 representing a single sheet or a sheet stack.

Figure 2:
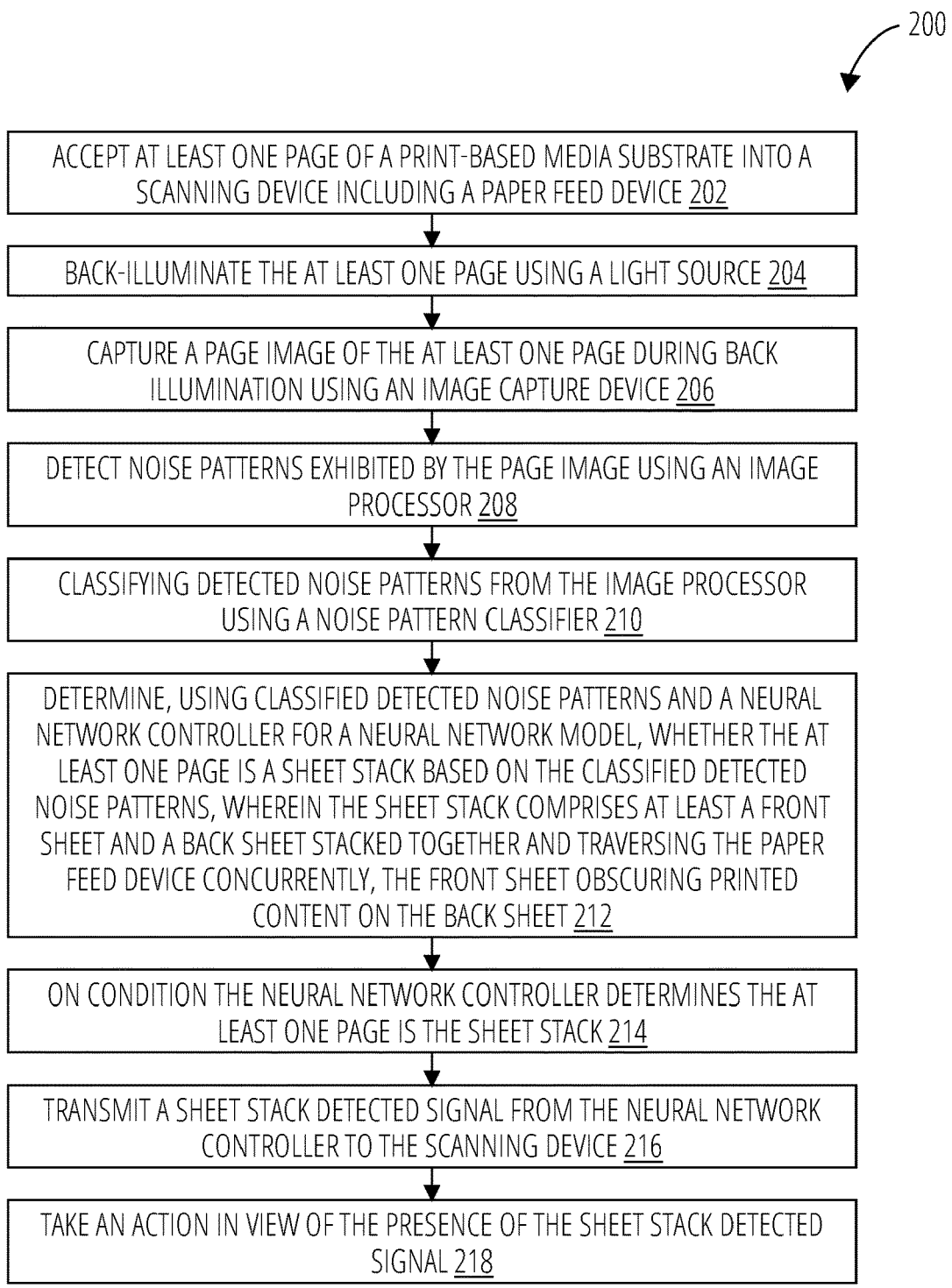
FIG. 2 illustrates a routine 200 in accordance with one embodiment.

FIG. 2 illustrates a routine 200 in accordance with one embodiment. The routine 200 of FIG. 2 may be performed by the elements of the computing apparatus 100 described in FIG. 1. In block 202, at least one page of a print-based media substrate may be accepted into a scanning device including a paper feed device. These may be such as the page 108, print-based media substrate 104, scanning device 110, and paper feed device 112 introduced in FIG. 1.

In block 204, the at least one page may be back-illuminated using a light source. In block 206, a page image of the at least one page may be captured during back-illumination using an image capture device. The light source may be the light source 114 shown in FIG. 1, and the image capture device and page image may be the image capture device 116 and page image 118 of FIG. 1

In block 208, noise patterns exhibited by the page image may be detected using an image processor, such as the image processor 120 introduced in FIG. 1. In block 210, detected noise patterns from the image processor may be classified using a noise pattern classifier, such as the noise pattern classifier 124 introduced in FIG. 1. In block 212, it may be determined using classified detected noise patterns and a neural network controller for a neural network model, whether the at least one page is a sheet stack based on the classified detected noise patterns. The neural network controller may be such as the neural network controller 128 introduced in FIG. 1.

The sheet stack may comprise at least a front sheet and a back sheet stacked together and traversing the paper feed device concurrently. In a sheet stack, the front sheet may obscure printed content on the back sheet. In such a case, the resulting scanning or copying task may result in an incomplete scan or copy of the original set of printed content, through the omission of the content from the back sheet in the resulting scanned data or copied pages.

In block 214, on condition the neural network controller determines the at least one page is the sheet stack, the routine 200 may proceed to block 216. In block 216, a sheet stack detected signal may be transmitted from the neural network controller to the scanning device. In block 218, an action may be taken in view of the presence of the sheet stack detected signal.

For example, a scanning device 110 such as that illustrated in FIG. 1 may halt scanning upon receiving this signal. The signal may be sent to a user interface 132 and a sheet stack alert 134 may be displayed or otherwise presented to a user. In one embodiment, an MFP may continue a scanning or copying job, but may insert a blank page or a page containing a notification in either the scanned file or printed copy. In one embodiment, a MFP may, as a result of the sheet stack detected signal, select a sheet of print-based media substrate of a different type, size, color, weight, etc., and insert it into the printed pages at the location of the sheet stack, such that a user may locate potential missing pages quickly and take action to confirm and correct missing printed content.

Figure 3:
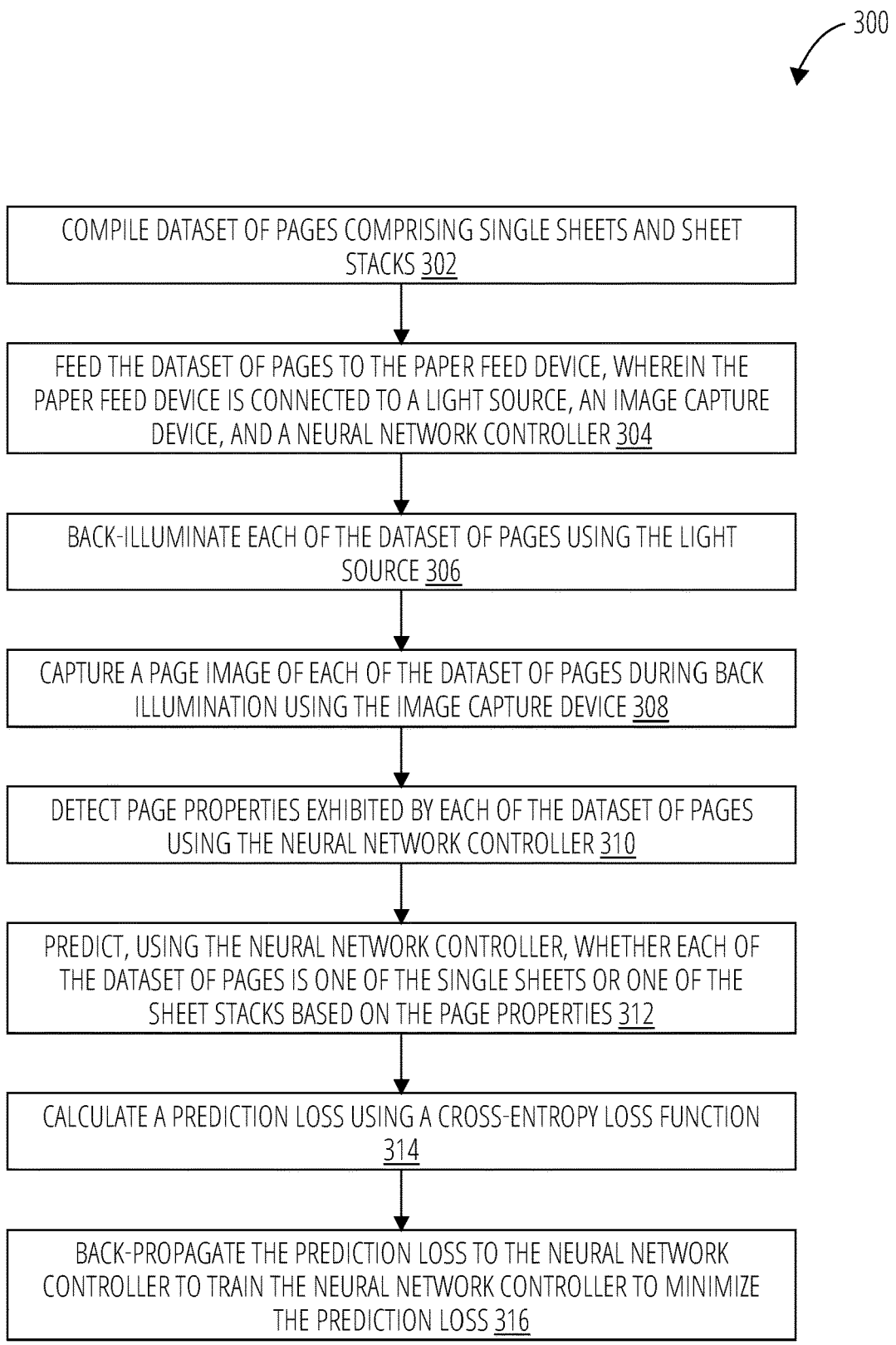
FIG. 3 illustrates a routine 300 in accordance with one embodiment.

FIG. 3 illustrates a routine 300 in accordance with one embodiment. The routine 300 of FIG. 3 may be performed by the elements of the computing apparatus 100 described in FIG. 1. In block 302, a dataset of pages may be compiled. The data set dataset of pages may comprise single sheets and sheet stacks, created from print-based media substrate containing printed content, such as the print-based media substrate 104 and printed content 106 described with respect to FIG. 1.

Single sheets include at least one of single-sided single sheets printed on one side and double-sided single sheets printed on both sides. Sheet stacks each comprise at least a front sheet and a back sheet stacked together and fed to a paper feed device concurrently, the front sheet obscuring printed content on the back sheet. The paper feed device may be the paper feed device 112 introduced in FIG. 1. The single sheets and the sheet stacks may be randomly distributed among the dataset of pages.

In block 304, the dataset of pages may be fed to the paper feed device, which may be the paper feed device 112 introduced in FIG. 1. The paper feed device is connected to a light source, an image capture device, and a neural network controller. These may be the light source 114, image capture device 116, and neural network controller 128 of FIG. 1.

In block 306, each of the dataset of pages may be back-illuminated using the light source. In block 308, a page image may be captured of each of the dataset of pages during back illumination using the image capture device. In block 310, page properties exhibited by each of the dataset of pages may be detected using the neural network controller. In block 312, the neural network controller may predict whether each of the dataset of pages is one of the single sheets or one of the sheet stacks based on the page properties. In this manner, the dataset of pages may receive a classification by the neural network controller. This classification may correspond to determining the classified detected noise patterns 126 as discussed with respect to FIG. 1.

In block 314, a prediction loss may be calculated using a cross-entropy loss function. In block 316, the prediction loss may be back-propagated to the neural network controller to train the neural network controller to minimize the prediction loss. In this manner, the neural network controller may be improved in its ability to detect sheet stacks.

Figure 4:
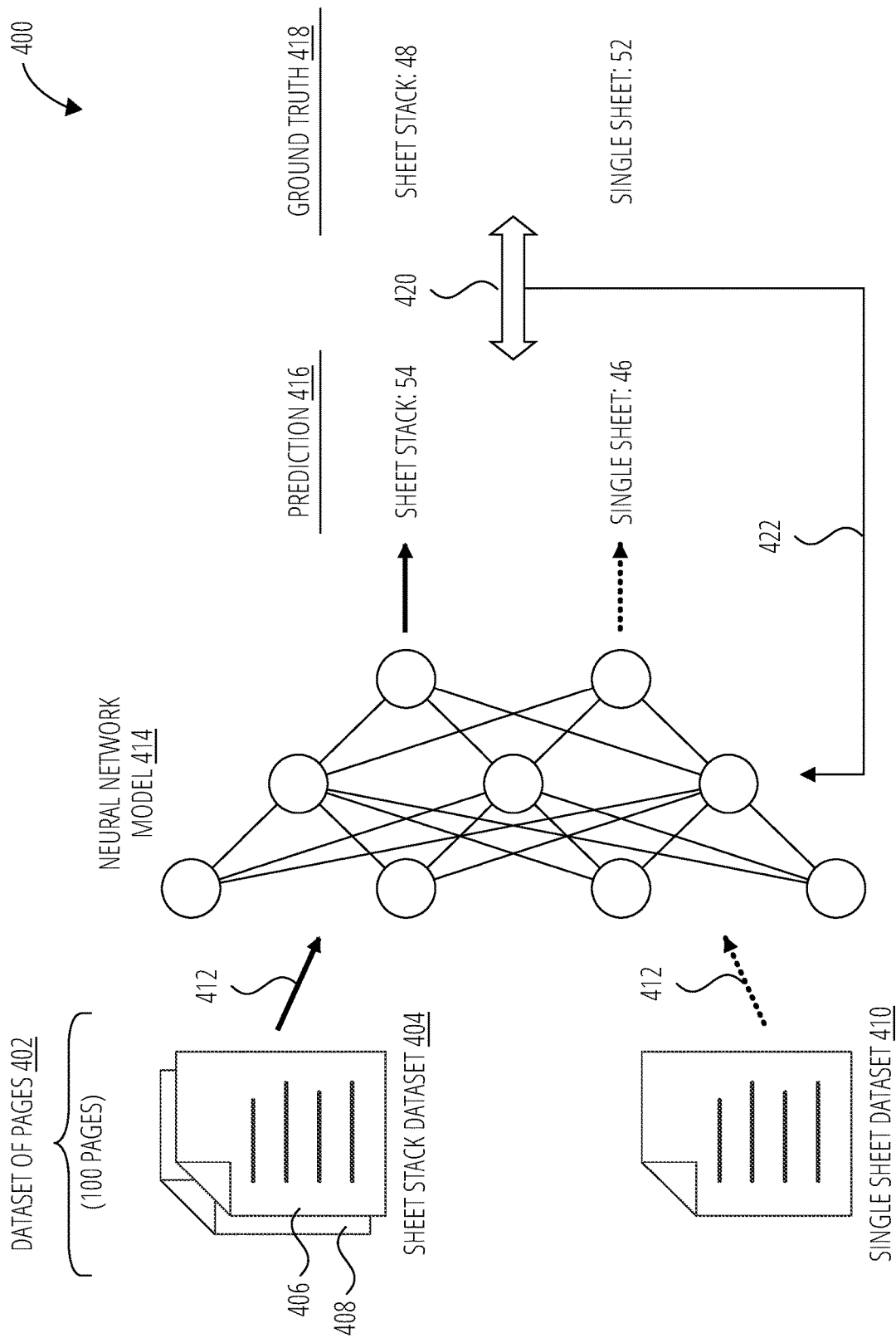
FIG. 4 illustrates the training process 400 in accordance with one embodiment.

FIG. 4 illustrates a training process 400 in accordance with one embodiment. The training process 400 may performed at least in part using the steps of routine 300. The training process 400 may involve a dataset of pages 402, a sheet stack dataset 404, a front sheet 406, a back sheet 408, a single sheet dataset 410, page properties 412, a neural network model 414, a prediction 416, a ground truth 418, a cross-entropy loss function 420, and a back-propagated prediction loss 422.

A dataset of pages 402 may contain two categories of images: a sheet stack dataset 404 of double feed scanned images, and a single sheet dataset 410 of single-feed scanned images. The sheet stack dataset 404 may include page images representing sheet stacks each having at least front sheet 406 and a back sheet 408.

The dataset of pages 402 may be batched and their page properties 412 fed randomly to the neural network model 414. For the feedforward process, the neural network model 414 model may make a prediction 416 about the output of the probability of each category (sheet stack and single sheet) with the given page image exhibiting the page properties 412 and generated from the pages of the dataset of pages 402.

The prediction 416 may be compared with the ground truth 418 using a cross-entropy loss function 420. The cross-entropy loss function 420 may be used to calculate a back-propagated prediction loss 422 that is back-propagated to the neural network model 414. The neural network model 414 may use the back-propagated prediction loss 422 to adjust the weights of the model to minimize the loss.

Figure 5A:
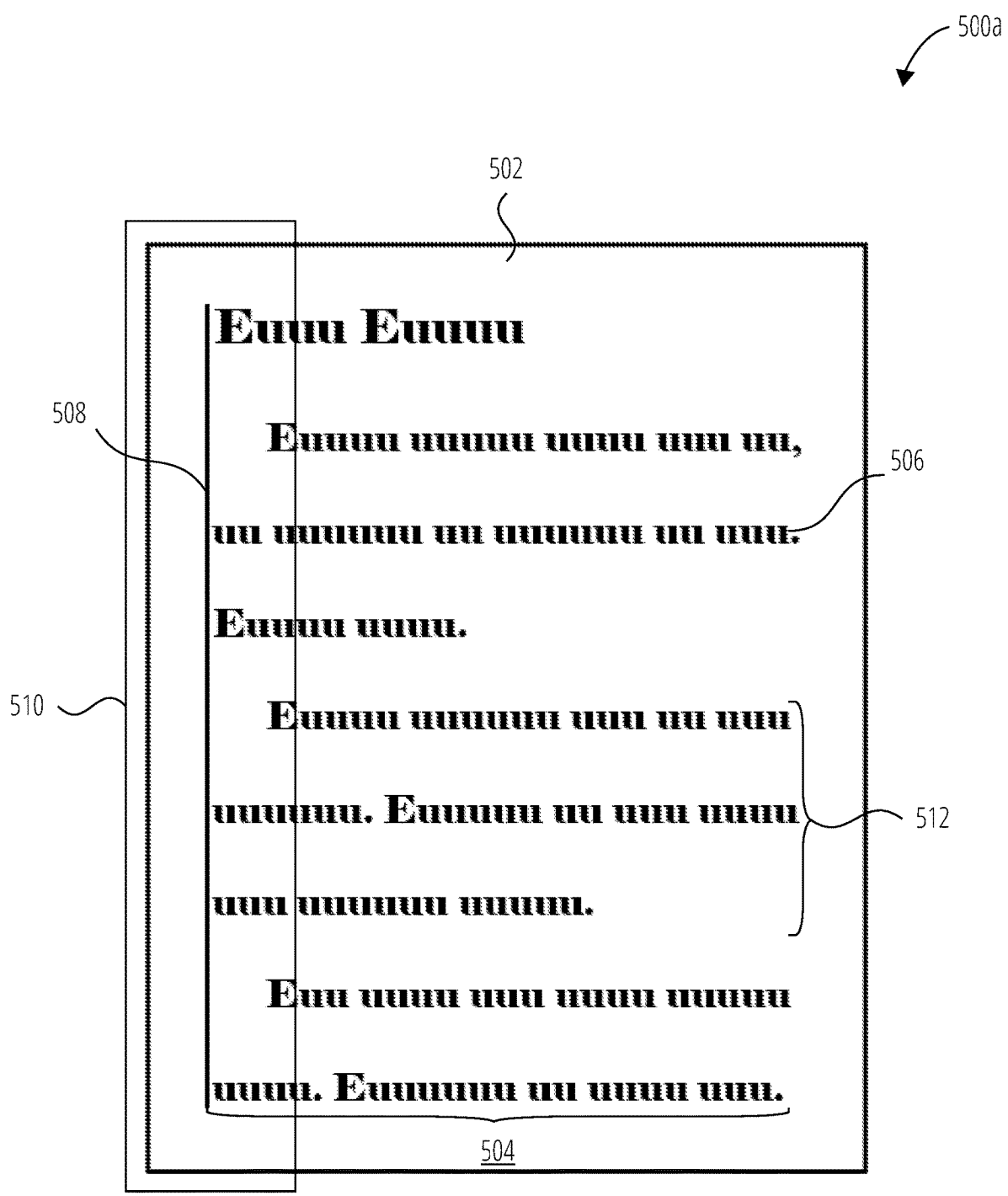
FIG. 5A illustrates a single-sided single sheet page luminance and printed content patterns 500a in accordance with one embodiment.
Figure 5B:
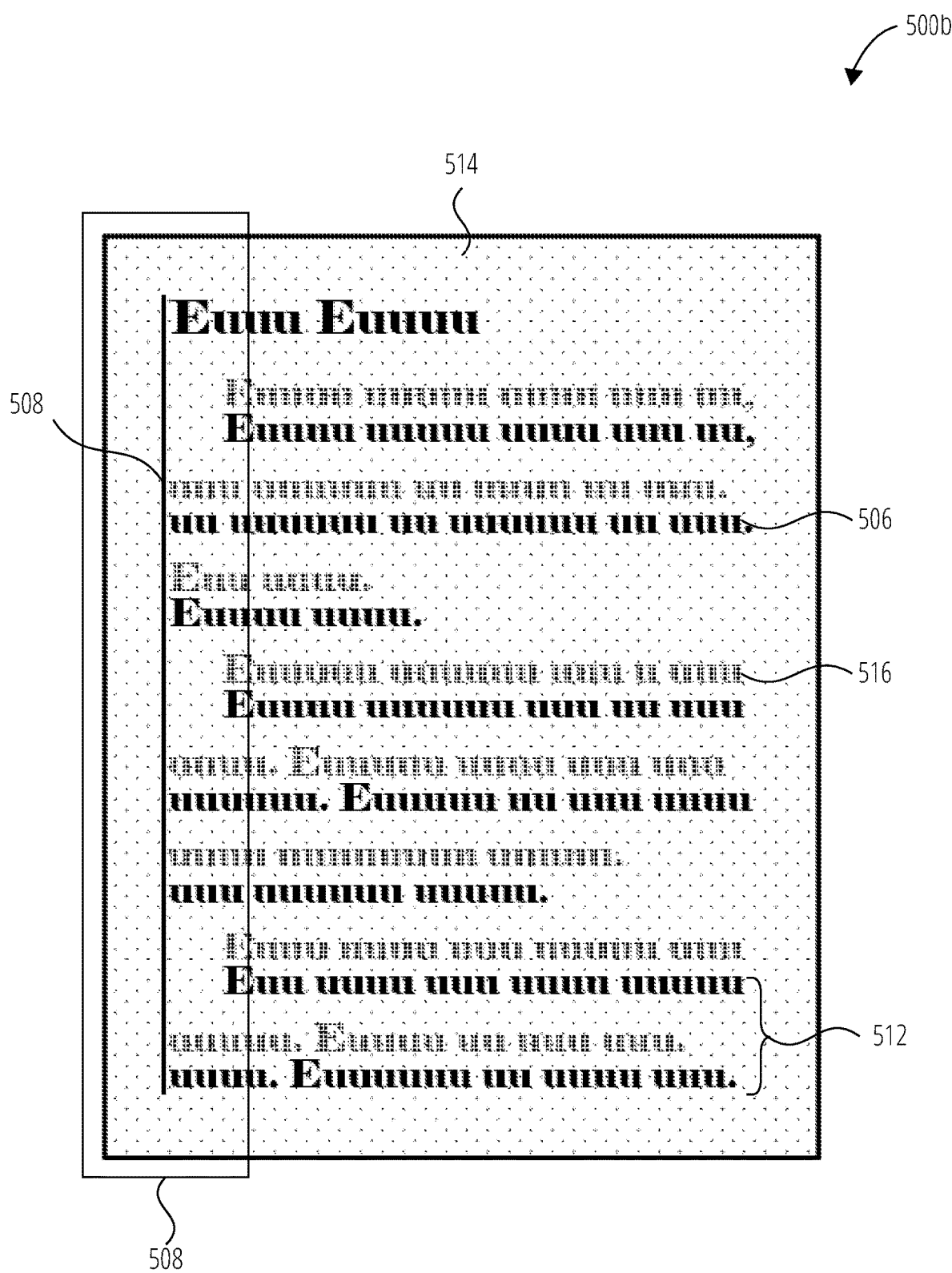
FIG. 5B illustrates a single-sided single sheet page luminance and printed content patterns 500a in accordance with one embodiment.
Figure 5C:
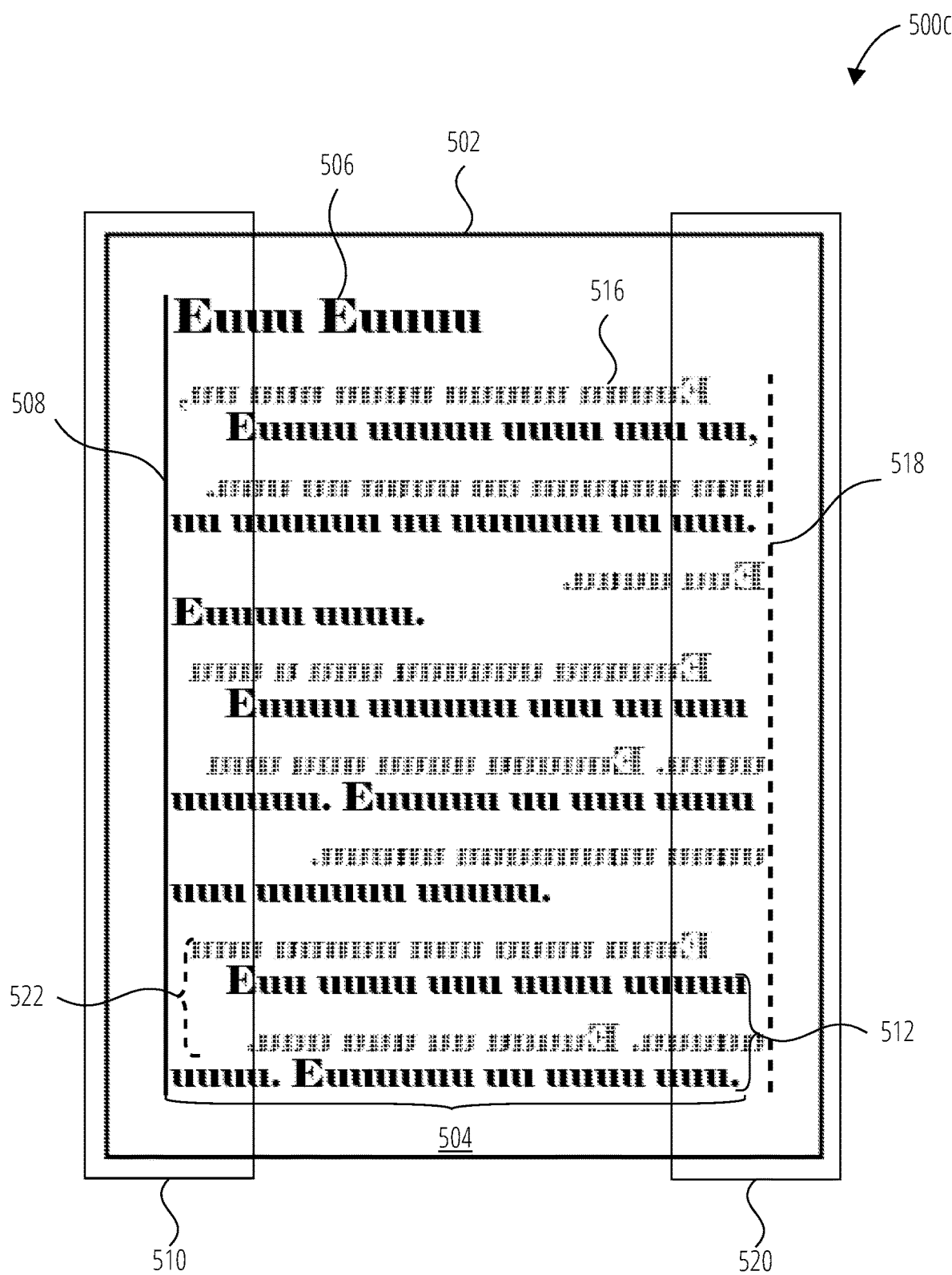
FIG. 5C illustrates a single-sided single sheet page luminance and printed content patterns 500a in accordance with one embodiment.

FIG. 5A-FIG. 5C depict examples of single-sided single sheet page luminance and printed content patterns 500a, sheet stack page luminance and printed content patterns 500b, and double-sided single sheet page luminance and printed content patterns 500c, respectively. These sheet and content configurations may comprise a single sheet page luminance 502, a printed content pattern 504, a front paragraph luminance 506, a consistent linear boundary parallel to a left edge of the page image 508, a left paragraph alignment 510, portions of the printed content pattern 512, a sheet stack page luminance 514, a back paragraph luminance 516, a consistent linear boundary parallel to a right edge of the page image 518, a right paragraph alignment 520, and other portions of the printed content pattern 522.

When the paper of a single sheet or the papers of a sheet stack are fed and scanned into a scanner, MFP, or other similar device, a strong light source back-illuminating the single sheet or sheet stack as previously described may generate different outputs depending on different conditions. The most prominent differences between single sheets and sheet stacks are the overall page luminance intensity difference and the noise pattern. In the case of a single sheet, the overall luminance of the document is brighter than that of sheet stack because light from a light source penetrates fewer papers. This may be seen in the difference shown between single sheet page luminance 502, see in FIG. 5A and FIG. 5C, and the sheet stack page luminance 514 indicated in FIG. 5B.

Noise patterns generated by printed content patterns 504 may also differ characteristically among single-sided single sheet page luminance and printed content patterns 500a, sheet stack page luminance and printed content patterns 500b, and double-sided single sheet page luminance and printed content patterns 500c. In the case of sheet stacks, brighter and darker paragraphs may co-exist and may be detectable, such as the front paragraph luminance 506 and back paragraph luminance 516 illustrated with respect to FIG. 5B. In comparison a more uniform luminance may be exhibited by the printed content pattern 504 on a single sheet, as shown by the front paragraph luminance 506 in FIG. 5A.

The disclosed solution may capture these differences to detect whether a page image represents a single sheet or a sheet stack. Similarly, the disclosed solution may detect and distinguish between a sheet stack as illustrated in FIG. 5B and a double-sided single sheet, as is illustrated in FIG. 5C. Firstly, the sheet stack page luminance 514 again may be differentiated from the single sheet page luminance 502, as may be seen in the sheet stack page luminance and printed content patterns 500b and double-sided single sheet page luminance and printed content patterns 500c.

Secondly, characterizable differences in noise patterns may be generated by paragraph alignments. For example, the noise patterns for the double-sided single sheet may indicate left paragraph alignment 510 exhibited by portions of the printed content pattern 512 as well as right paragraph alignment 520 exhibited by other portions of the printed content pattern 522. This may present as a consistent linear boundary parallel to a right edge of the page image 518 caused by right-aligned back paragraphs (as seen from the front of the page) in addition to the consistent linear boundary parallel to a left edge of the page image 508 caused by left aligned front paragraphs. Such noise patterns are unlikely to occur with sheet stacks, where all portions of the printed content pattern 512 are more likely to be aligned to the left, as indicated by the consistent linear boundary parallel to a left edge of the page image 508 and the lack of consistent linear boundary parallel to a right edge of the page image 518, even where they exhibit distinctive front paragraph luminances 506 and back paragraph luminances 516. Thus, the disclosed solution may in one embodiment detect and distinctly categorize single-sided single sheets, sheet stacks, and double-sided single sheets. As may be recognized from this description, one embodiment may be able to detect single-sided single sheets that have been inserted in an incorrect orientation, and thus present an unprinted back to the image capture device 116 while having printing on their front.

Figure 6:
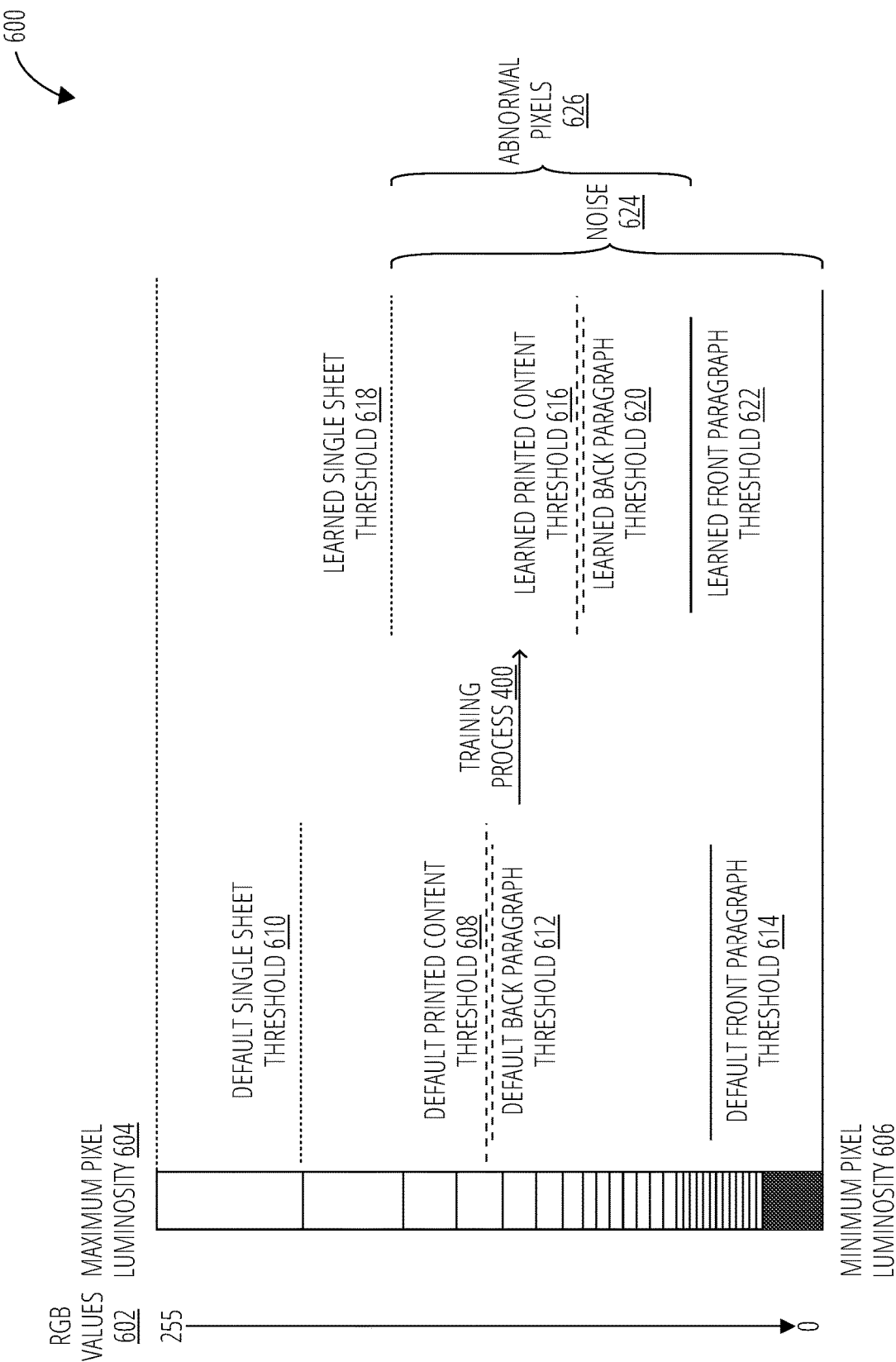
FIG. 6 illustrates exemplary luminosity thresholds 600 in accordance with one embodiment.

FIG. 6 illustrates exemplary luminosity thresholds 600 in accordance with one embodiment. The exemplary luminosity thresholds 600 may be used in the disclosed solution in analyzing pixels and noise patterns in a page image, such as the page image 118 created by the computing apparatus 100 of FIG. 1.

Pixels in a page image, such as the pixels 146 of the page image 118 introduced in FIG. 1, may be represented as having RGB values 602 ranging from 0 to 225. In RGB color encoding, having a 0 for all RGB values 602 represents the color black, having the minimum pixel luminosity 606, and all RGB values 602 being assigned or detected as 225 represents the color white, having the maximum pixel luminosity 604.

In one embodiment, a neural network model may be programmed to compare luminosity of pixels in a page image to a default printed content threshold 608. Pixels 146 having a luminosity at or above the default printed content threshold 608 (i.e., pixels lighter than the default printed content threshold 608) may be determined to be representative of background page pixels, rather than printed content pixels.

The neural network model may further include a default single sheet threshold 610, as shown. Pixels with luminosity above this default single sheet threshold 610 may be expected to indicate a single sheet rather than a sheet stack, while pixels between the default printed content threshold 608 and default single sheet threshold 610 may be expected to indicate a sheet stack, as the background page luminosity may be determined to be too dark to have been generated by a single sheet. Pixels having luminosity below the default printed content threshold 608 may further be compared to a default back paragraph threshold 612 and a default front paragraph threshold 614 to determine whether the noise pattern may be indicative of back paragraphs, which may indicate either a sheet stack or a double-sided single sheet.

In one embodiment, determination of pixels indicating a background page luminosity may be made by examining pixels in regions that would generally not contain printed content, such as along the outer edges of the page image. In another embodiment, an average background page value for comparison with the default single sheet threshold 610 may be calculated from all pixels with luminance above the default printed content threshold 608. Statistical analyses of all pixel luminosity values may yield high numbers of pixels clustered around certain peak values, and these peaks may be taken as representative luminosities. The number of peaks observed might in one embodiment be indicative of the presence or absence of back paragraph printed content, which might result in a recognizable back paragraph luminance 516 as illustrated in FIG. 5B and FIG. 5C. In one embodiment, values for default back paragraph thresholds 612 may be programmed to differentiate between the front-facing back paragraphs expected in a sheet stack of single-sided single sheets, the rear-facing back paragraphs expected in a double-sided single sheet, and the front and rear facing paragraphs that may appear in a sheet stack of double-sided single sheets. Other methods of determining default values to use in a neural network model, as well as for determining measured pixel values to be compared with those default thresholds, will be readily understood by one of ordinary skill in the art.

Through the workings of the training process 400 illustrated in FIG. 4, a neural network model may be trained to use learned thresholds which may be more refined and yield greater accuracy than the default thresholds. For example, the training process 400 may lead the neural network model to recognize a learned printed content threshold 616 lower than the default back paragraph threshold 612, indicating a wider range of high luminosity as representative of unprinted print-based media substrate, as shown. A learned single sheet threshold 618 lower than the default single sheet threshold 610 may similarly be developed through the training process 400. The learned back paragraph threshold 620 may be lower than the default back paragraph threshold 612, while the learned front paragraph threshold 622 may be higher than the default front paragraph threshold 614. In one embodiment, the neural network model may be trained to recognize different threshold values for different print-based media substrates. For example, thicker paper stock may be expected to have a lower single sheet page luminance, and the neural network model may need to account for such variations for certain implementations.

In one embodiment, pixels may be filtered based on their luminosity. The filter may be such as was described with respect to filter 148, introduced in FIG. 1. In one embodiment, the filter may be a low pass filter. Pixels exhibiting a luminosity below the learned single sheet threshold 618 (or default single sheet threshold 610 if a learned threshold has not been established) may be considered as representing noise 624, as shown. In this context, "noise" may refer to information unrelated to an expected signal, where the expectation is a blank, single sheet, represented by pixels having luminosity above the learned (618) and/or default (610) single sheet threshold. These noise 624 pixels may be further analyzed to determine if abnormal pixels 626 are indicated. In his context, abnormal pixels 626 may be pixels having a luminosity within a range not expected for a single sheet of unprinted print-based media substrate or printed content on the front of the print-based media substrate (which may be considered "normal" pixels). In one embodiment, therefore, the presence of noise 624 may indicate more than a single sheet of print-based media substrate, printed content that is not on the front sheet of a single sheet or sheet stack of print-based media substrate, or both.

Figure 7:
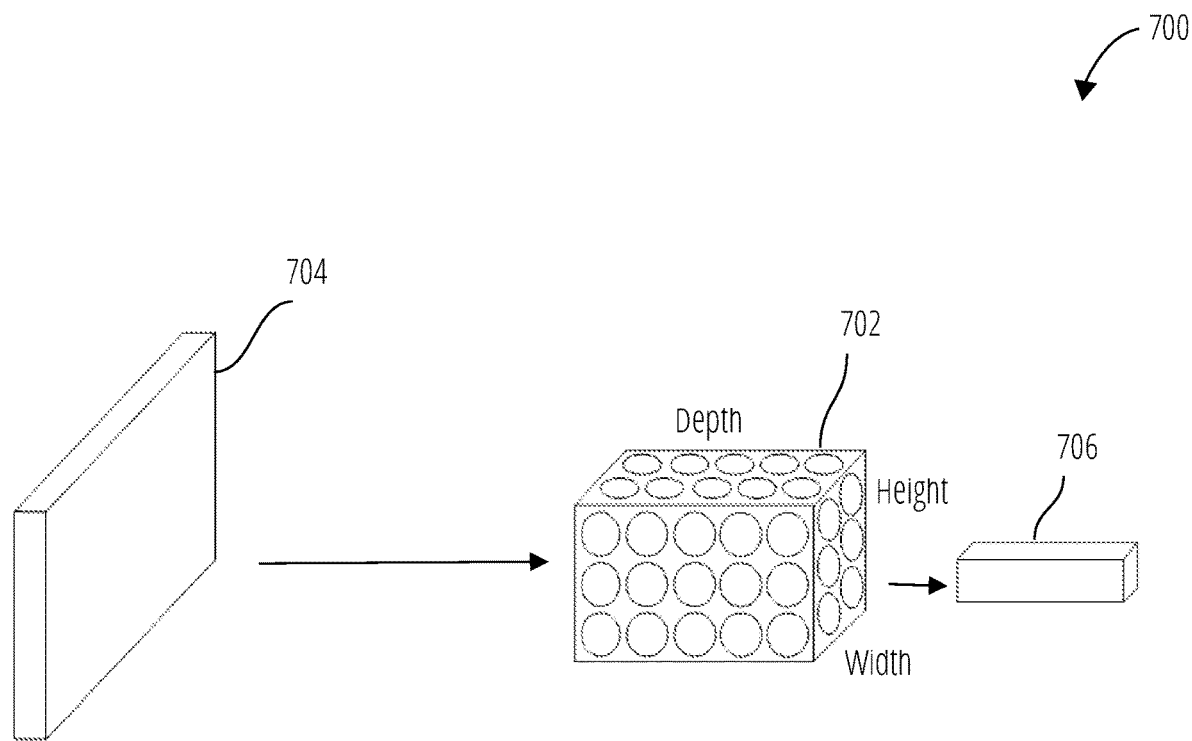
FIG. 7 depicts a convolutional neural network 700 in accordance with one embodiment.

FIG. 7 depicts an exemplary convolutional neural network 700. The convolutional neural network 700 comprises a three-dimensional neuron configuration (width, height, depth), as depicted in convolutional layer 702. Layers of the convolutional neural network 700 transform a 3D volume of inputs to a 3D output volume of neuron activations. In this example, the input layer 704 encodes the image, therefore its width and height are configured to the dimensions of the image, and the depth of the 104 is configured to three (e.g., for Red, Green, and Blue channels). The convolutional layer 702 further transforms the outputs of the input layer 704. The output layer 706 transforms the outputs of the convolutional layer 702 into one or more classifications of the image content.

Figure 8:
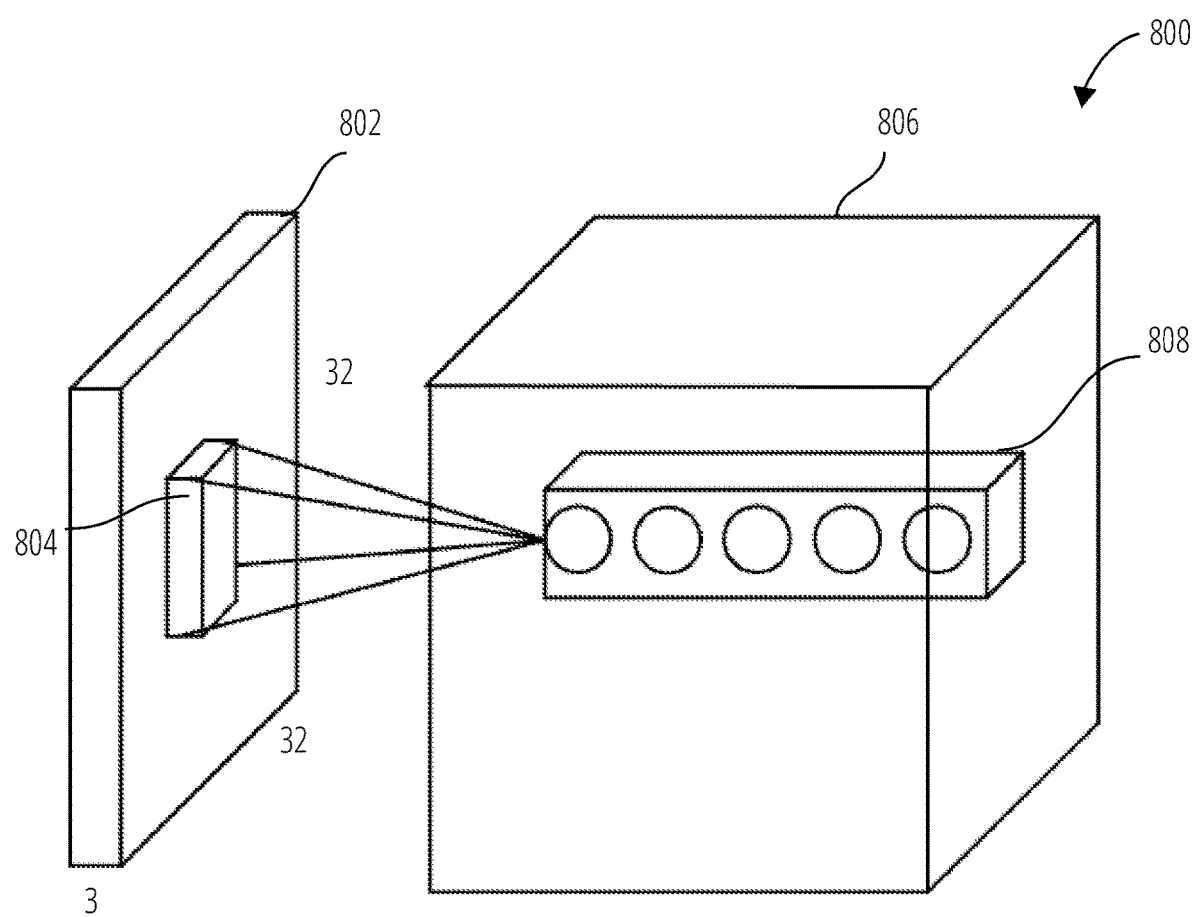
FIG. 8 depicts a convolutional neural network layers 800 in accordance with one embodiment.

FIG. 8 depicts an exemplary convolutional neural network layers 800 in more detail. An example subregion of the input layer region 804, from a tile 802 of the input layer 704 corresponding to a tile of an image, is transformed by a convolutional layer subregion 808 in the convolutional layer 806. The tile 802 in this example is 32×32 neurons (e.g., corresponding to a 32×32 tile 802), and three neurons deep (e.g., three color channels per pixel of the input region input to the tile 802). Each neuron in the convolutional layer 806 is coupled to a local region in the tile 802 spatially (e.g., in height and width), but to the full depth (i.e., to all color channels if the input is an image). There are multiple neurons (five in this example) along the depth of the convolutional layer subregion 808 that analyze the subregion of the input layer region 804 of the tile 802, in which each neuron of the convolutional layer subregion 808 may receive inputs from every neuron of the subregion of the input layer region 804.

Figure 9:
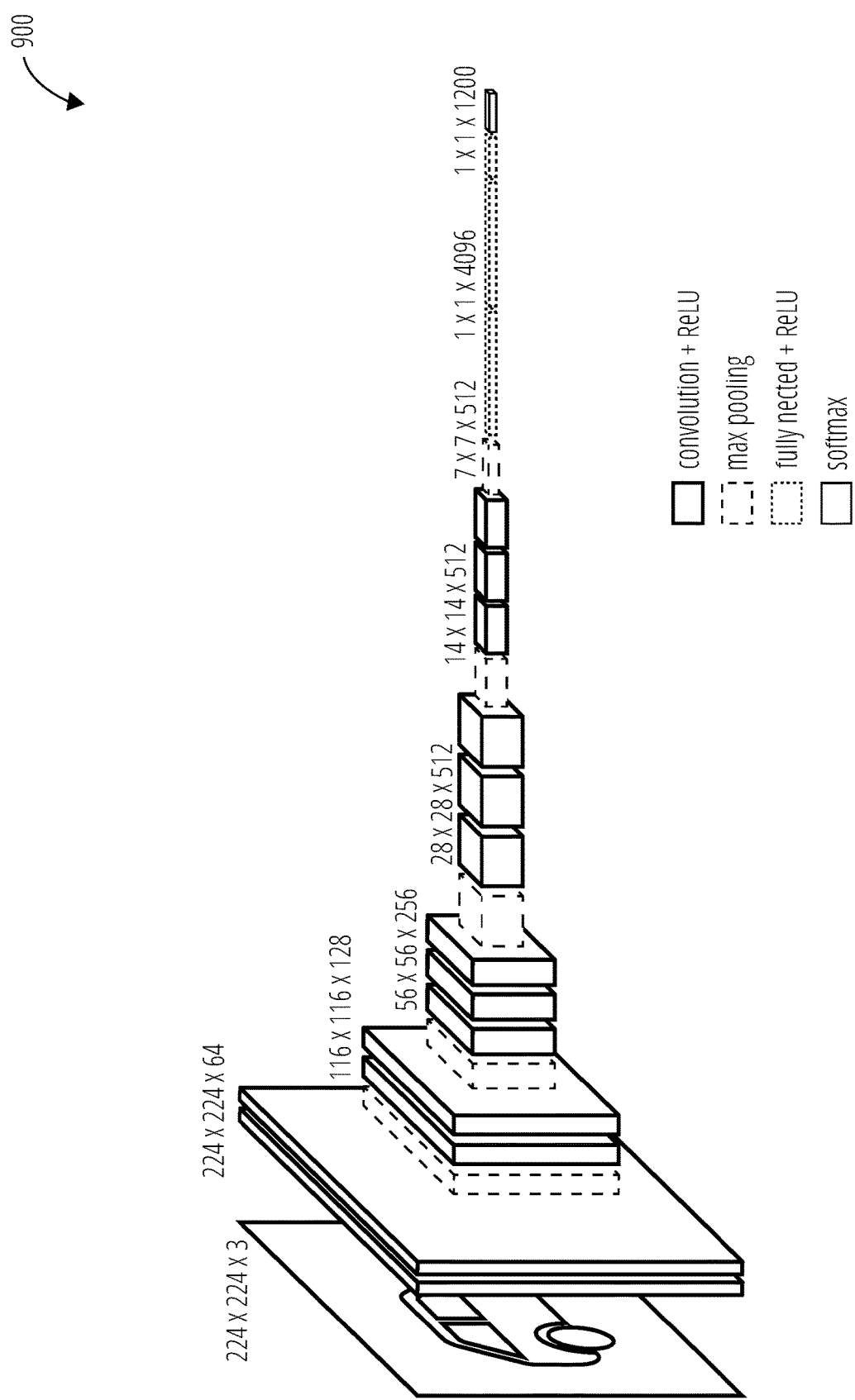
FIG. 9 depicts a VGG network 900 architecture known as VGG16 in one embodiment.

FIG. 9 depicts a VGG network architecture known as VGG16 in one embodiment. The model achieves 92.7% top-5 test accuracy on ImageNet, a dataset of millions of images belonging to thousands of classes. VGG16 utilizes multiple 3×3 kernel-sized filters in a series of convolutional layers.

The input in this example is a 224×224 RGB image. The image is passed through a stack of convolutional (cony) layers, each with filters of a 3×3 receptive field. In one configuration, the model also utilizes 1×1 convolution filters to provide a linear transformation of the input channels (followed by a non-linearity layer). The convolution stride is fixed to 1 pixel; the spatial padding is set such that the spatial resolution is preserved after convolution, i.e., the padding is 1-pixel for the 3×3 cony layers. Spatial pooling is carried out by five max-pooling layers, which follow some of the cony layers (not all the cony layers are followed by max-pooling). Max-pooling is performed over a 2×2 pixel window, with stride 2.

Three fully connected (FC) layers follow a stack of convolutional layers (which has a different depth in different configurations of the model). The first two FC layers comprise 4096 channels each. The third performs 1000-way ImageNet Large Scale Visual Recognition Challenge (ILSVRC) classification and thus comprises one channel per class. The final layer is a Softmax layer.

Hidden layers are equipped with rectification (ReLU) non-linearity. Most VGG16 configurations do not utilize Local Response Normalisation (LRN), as such normalization does not improve the performance but incurs increased memory consumption and computation time.

Figure 10:
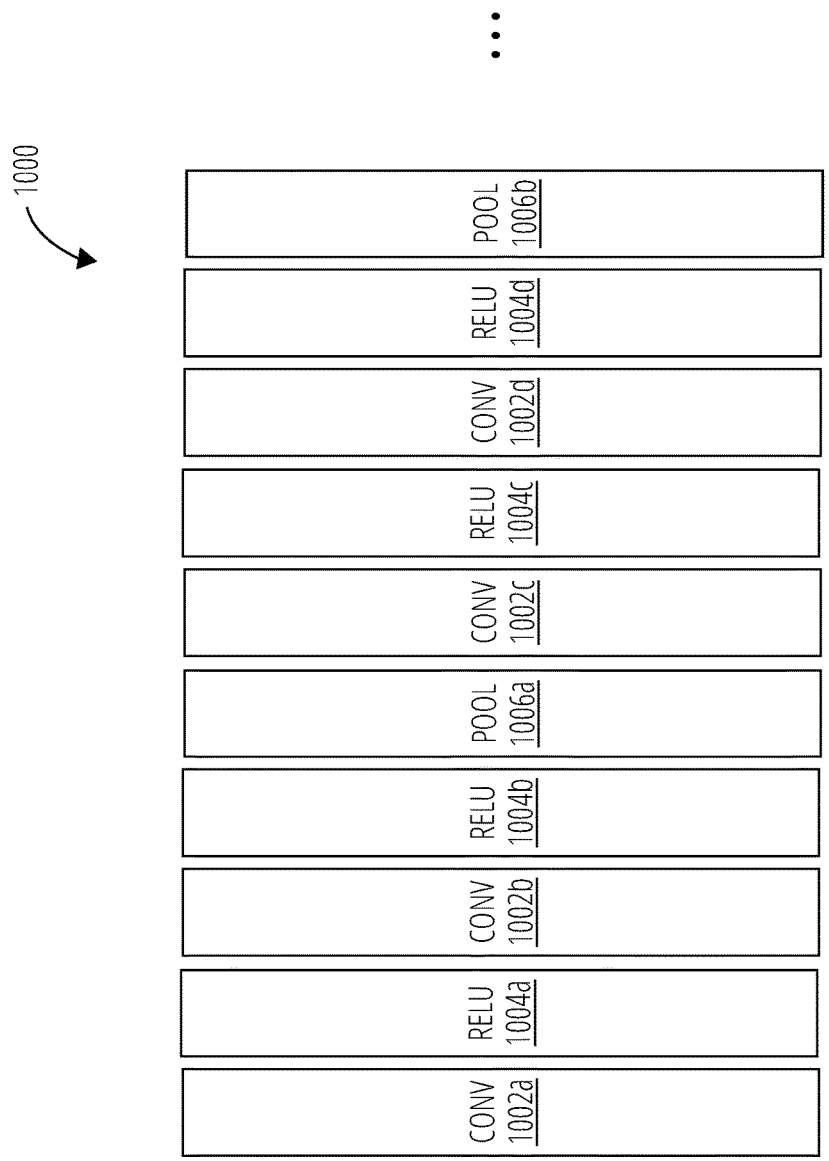
FIG. 10 depicts a VGG net 1000 in accordance with one embodiment.

FIG. 10 depicts a form of a CNN known as a VGG net 1000. The initial convolution layer 1002a stores the raw image pixels and the final pooling layer 1006b determines the class scores. The intermediate convolution layers (convolution layer 1002b, convolution layer 1002c, and convolution layer 1002d) and rectifier activations (RELU layer 1004a, RELUlayer 1004b, RELUlayer 1004c, and RELUlayer 1004d) and intermediate pooling layers (pooling layer 1006a, pooling layer 1006b) along the processing path are also depicted.

The VGG net 1000 replaces the (often large) single-layer filters of basic CNNs with multiple smaller-sized (e.g., 3×3) filters in series. With a given receptive field (the effective area size of the input image), multiple stacked smaller-size filters may perform better at image feature classification than a single layer with a larger filter size, because multiple non-linear layers increase the depth of the network which enables it to learn more complex features. In a VGG net 1000 each pooling layer may be small, e.g., 2×2.

Figure 11:
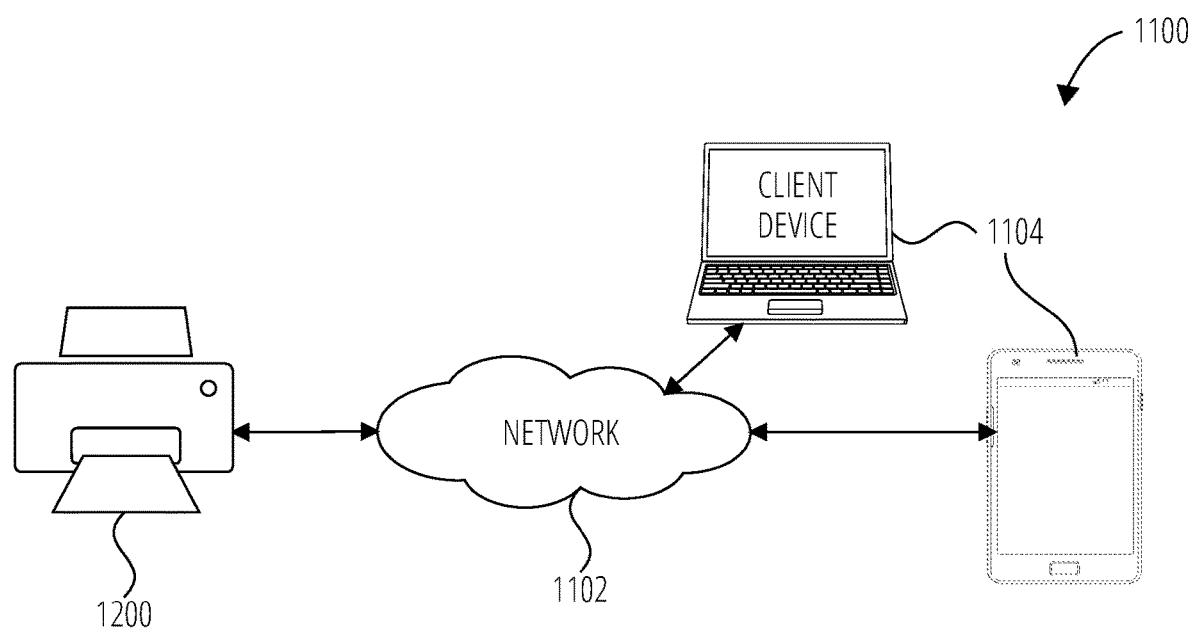
FIG. 11 illustrates a simplified system 1100 in which client devices 1104 are communicatively coupled via a network 1102.

FIG. 11 illustrates a system 1100 in which a printer 1200 and a client device 1104 are connected to a network 1102. In various embodiments, the network 1102 may include the Internet, a local area network ("LAN"), a wide area network ("WAN"), and/or other data network. In addition to traditional data-networking protocols, in some embodiments, data may be communicated according to protocols and/or standards including near field communication ("NFC"), Bluetooth, power-line communication ("PLC"), and the like. In some embodiments, the network 1102 may also include a voice network that conveys not only voice communications, but also non-voice data such as Short Message Service ("SMS") messages, as well as data communicated via various cellular data communication protocols, and the like.

In various embodiments, the client device 1104 may include desktop personal computers (PCs), mobile phones, laptops, tablets, wearable computers, or other computing devices that are capable of connecting to the network 1102 and communicating with the printer 1200, such as described herein.

In various embodiments, additional infrastructure (e.g., short message service centers, cell sites, routers, gateways, firewalls, and the like), as well as additional devices may be present. Further, in some embodiments, the functions described as being provided by some or all of the printer 1200 and the client device 1104 may be implemented via various combinations of physical and/or logical devices.

Figure 12:
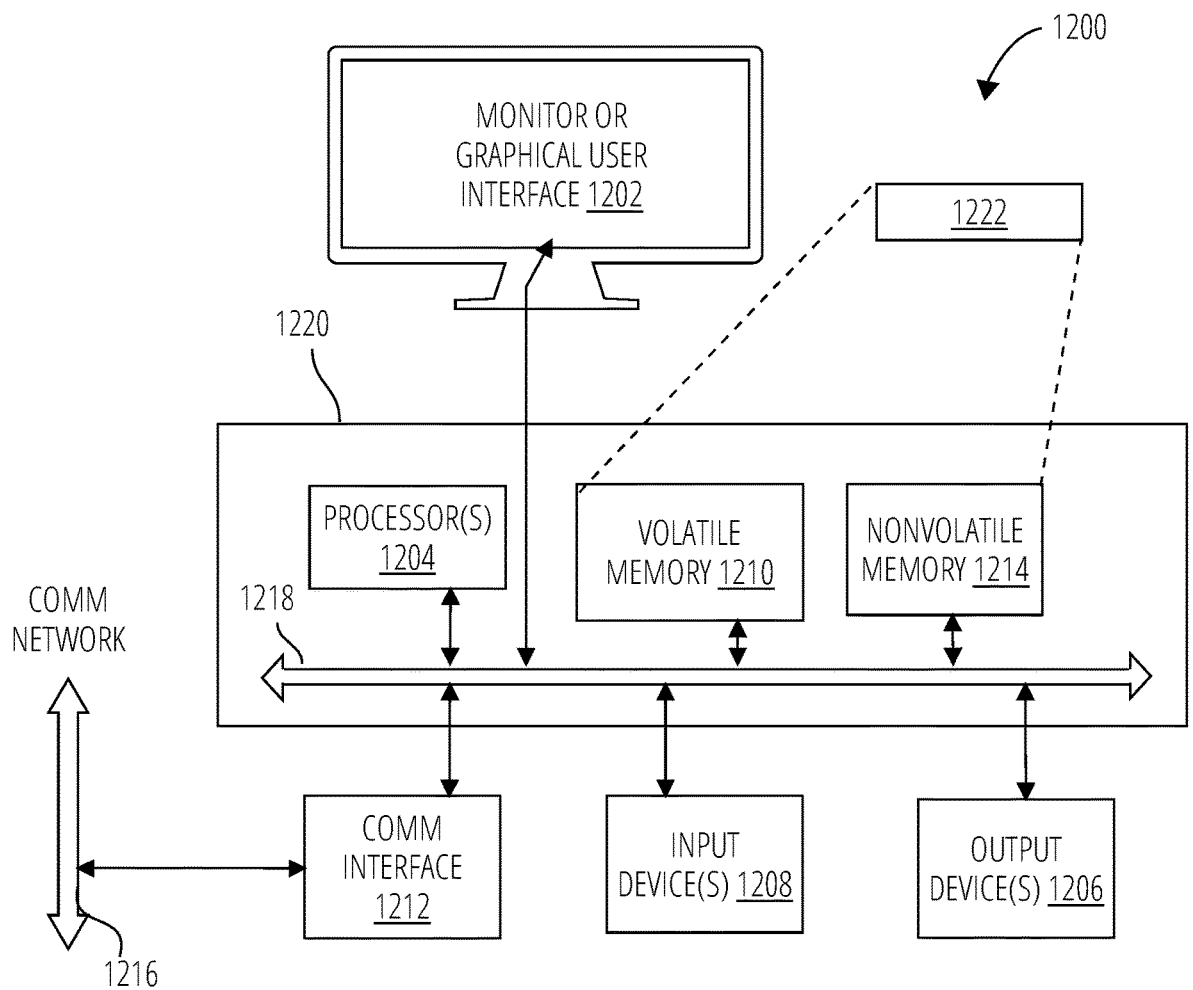
FIG. 12 is an example block diagram of a printer 1200 that may incorporate embodiments of the present disclosure.

FIG. 12 is an example block diagram of a printer 1200 that may incorporate embodiments of the present disclosure. FIG. 12 is merely illustrative of a machine to carry out aspects of the technical processes described herein, and does not limit the scope of the claims. One of ordinary skill in the art would recognize other variations, modifications, and alternatives. In one embodiment, the printer 1200 typically includes a monitor or graphical user interface 1202, a data processing system 1220, a communication network interface 1212, input device(s) 1208, output device(s) 1206, and the like.

As depicted in FIG. 12, the data processing system 1220 may include one or more processor(s) 1204 that communicate with a number of peripheral devices via a bus subsystem 1218. These peripheral devices may include input device(s) 1208, output device(s) 1206, communication network interface 1212, and a storage subsystem, such as a volatile memory 1210 and a nonvolatile memory 1214.

The volatile memory 1210 and/or the nonvolatile memory 1214 may store computer-executable instructions and thus forming logic 1222 that when applied to and executed by the processor(s) 1204 implement embodiments of the processes disclosed herein.

The input device(s) 1208 include devices and mechanisms for inputting information to the data processing system 1220. These may include a keyboard, a keypad, a touch screen incorporated into the monitor or graphical user interface 1202, audio input devices such as voice recognition systems, microphones, and other types of input devices. In various embodiments, the input device(s) 1208 may be embodied as a computer mouse, a trackball, a track pad, a joystick, wireless remote, drawing tablet, voice command system, eye tracking system, and the like. The input device (s) 1208 typically allow a user to select objects, icons, control areas, text and the like that appear on the monitor or graphical user interface 1202 via a command such as a click of a button or the like.

The output device(s) 1206 include devices and mechanisms for outputting information from the data processing system 1220. These may include print heads, the monitor or graphical user interface 1202, speakers, and so on as well understood in the art.

The communication network interface 1212 provides an interface to communication networks (e.g., communication network 1216) and devices external to the data processing system 1220. The communication network interface 1212 may serve as an interface for receiving data from and transmitting data to other systems. Embodiments of the communication network interface 1212 may include an Ethernet interface, a modem (telephone, satellite, cable, ISDN), (asynchronous) digital subscriber line (DSL), Fire-Wire, USB, a wireless communication interface such as BlueTooth or WiFi, a near field communication wireless interface, a cellular interface, and the like.

The communication network interface 1212 may be coupled to the communication network 1216 via an antenna, a cable, or the like. In some embodiments, the communication network interface 1212 may be physically integrated on a circuit board of the data processing system 1220, or in some cases may be implemented in software or firmware, such as "soft modems", or the like.

The printer 1200 may include logic that enables communications over a network using protocols such as HTTP, TCP/IP, RTP/RTSP, IPX, UDP and the like.

The volatile memory 1210 and the nonvolatile memory 1214 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1210 and the nonvolatile memory 1214 may be configured to store the basic programming and data constructs that provide the functionality of the disclosed processes and other embodiments thereof that fall within the scope of the present disclosure.

Logic 1222 that implements embodiments of the present disclosure may be stored in the volatile memory 1210 and/or the nonvolatile memory 1214. Said logic 1222 may be read from the volatile memory 1210 and/or nonvolatile memory 1214 and executed by the processor(s) 1204. The volatile memory 1210 and the nonvolatile memory 1214 may also provide a repository for storing data used by the logic 1222.

The volatile memory 1210 and the nonvolatile memory 1214 may include a number of memories including a main random access memory (RAM) for storage of instructions and data during program execution and a read only memory (ROM) in which read-only non-transitory instructions are stored. The volatile memory 1210 and the nonvolatile memory 1214 may include a file storage subsystem providing persistent (non-volatile) storage for program and data files. The volatile memory 1210 and the nonvolatile memory 1214 may include removable storage systems, such as removable flash memory.

The bus subsystem 1218 provides a mechanism for enabling the various components and subsystems of data processing system 1220 communicate with each other as intended. Although the communication network interface 1212 is depicted schematically as a single bus, some embodiments of the bus subsystem 1218 may utilize multiple distinct busses.

It will be readily apparent to one of ordinary skill in the art that the printer 1200 may be a high-performance commercial network printer, a desktop printer, a portable printer, and so on. As commonly known in the art, the printer 1200 may be implemented as a collection of multiple networked printers. Further, the printer 1200 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Machine Embodiments

Figure 13:
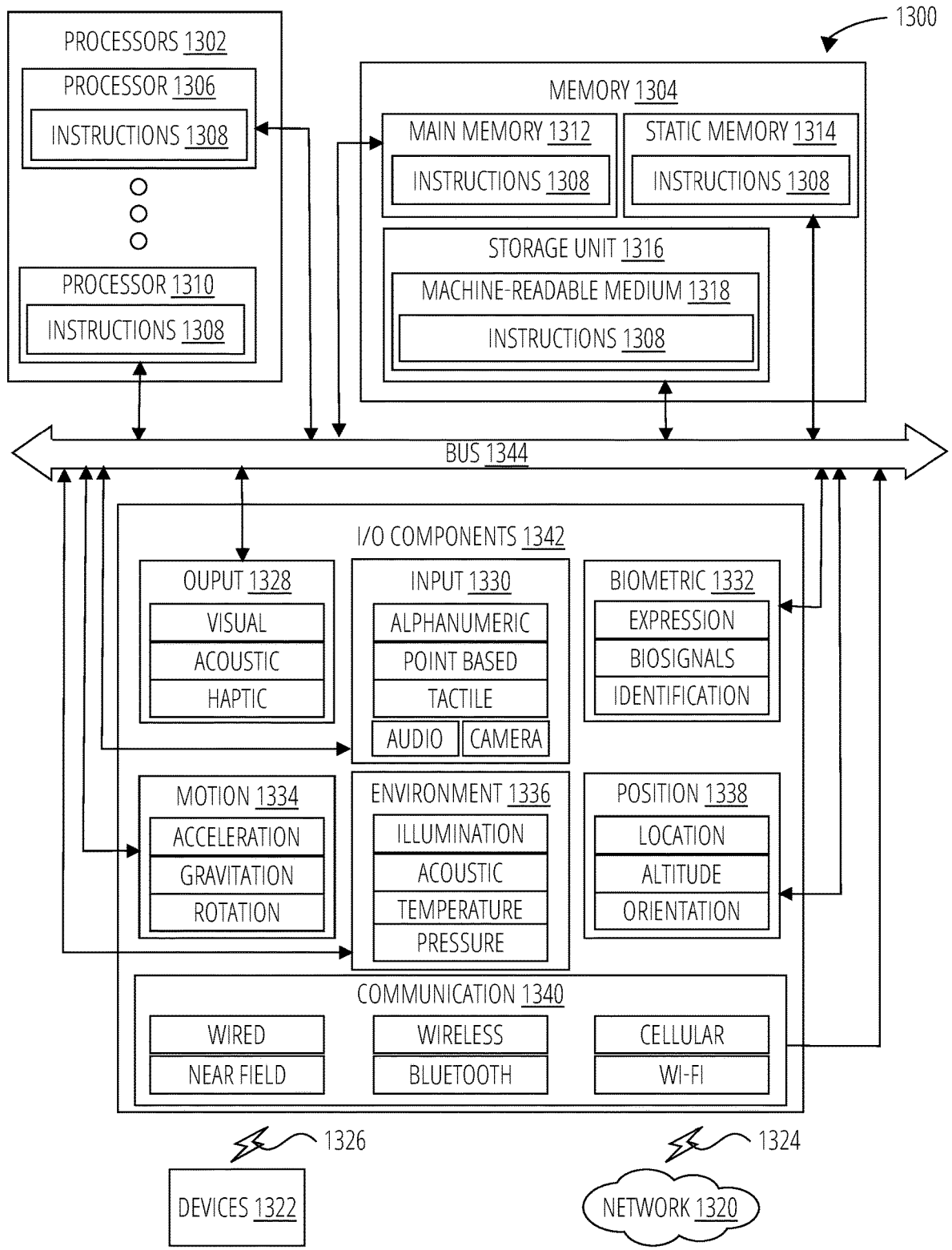
FIG. 13 illustrates a diagrammatic representation of a machine 1300 in the form of a computer system within which a set of instructions may be executed for causing the machine to perform any one or more of the methodologies discussed herein, according to an example embodiment.

FIG. 13 depicts a diagrammatic representation of a machine 1300 in the form of a computer system within which logic may be implemented to cause the machine to perform any one or more of the functions or methods disclosed herein, according to an example embodiment.

Specifically, FIG. 13 depicts a machine 1300 comprising instructions 1308 (e.g., a program, an application, an applet, an app, or other executable code) for causing the machine 1300 to perform any one or more of the functions or methods discussed herein. For example the instructions 1308 may cause the machine 1300 to carry out embodiments of the techniques disclosed herein. The instructions 1308 configure a general, non-programmed machine into a particular machine 1300 programmed to carry out said functions and/or methods.

In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while a single machine 1300 is depicted, the term "machine" shall also be taken to include a collection of machines that individually or jointly execute the instructions 1308 to perform any one or more of the methodologies or subsets thereof discussed herein.

The machine 1300 may include processors 1302, memory 1304, and I/O components 1342, which may be configured to communicate with each other such as via one or more bus 1344. In an example embodiment, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 1306 and processor 1310) to execute the instructions 1308. The term "processor" is intended to include multi-core processors that may comprise two or more independent processors (sometimes referred to as "cores") that may execute instructions contemporaneously. Although FIG. 13 depicts multiple processors 1302, the machine 1300 may include a single processor with a single core, a single processor with multiple cores (e.g., a multi-core processor), multiple processors with a single core, multiple processors with multiples cores, or any combination thereof.

The memory 1304 may include one or more of a main memory 1312, a static memory 1314, and a storage unit 1316, each accessible to the processors 1302 such as via the bus 1344. The main memory 1312, the static memory 1314, and storage unit 1316 may be utilized, individually or in combination, to store the instructions 1308 embodying any one or more of the functionality described herein. The instructions 1308 may reside, completely or partially, within the main memory 1312, within the static memory 1314, within a machine-readable medium 1318 within the storage unit 1316, within at least one of the processors 1302 (e.g., within the processor's cache memory), or any suitable combination thereof, during execution thereof by the machine 1300.

The I/O components 1342 may include a wide variety of components to receive input, provide output, produce output, transmit information, exchange information, capture measurements, and so on. The specific I/O components 1342 that are included in a particular machine will depend on the type of machine. For example, portable machines such as mobile phones will likely include a touch input device or other such input mechanisms, while a headless server machine will likely not include such a touch input device. It will be appreciated that the I/O components 1342 may include many other components that are not shown in FIG. 13. The I/O components 1342 are grouped according to functionality merely for simplifying the following discussion and the grouping is in no way limiting. In various example embodiments, the I/O components 1342 may include output components 1328 and input components 1330. The output components 1328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 1342 may include biometric components 1332, motion components 1334, environmental components 1336, or position components 1338, among a wide array of possibilities. For example, the biometric components 1332 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 may include acceleration sensor components (e.g., accelerometer), gravitation sensor components, rotation sensor components (e.g., gyroscope), and so forth. The environmental components 1336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1342 may include communication components 1340 operable to couple the machine 1300 to a network 1320 or devices 1322 via a coupling 1324 and a coupling 1326, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 1304, main memory 1312, static memory 1314, and/or memory of the processors 1302) and/or storage unit 1316 may store one or more sets of instructions and data structures (e.g., software) embodying or utilized by any one or more of the methodologies or functions described herein. These instructions (e.g., the instructions 1308), when executed by processors 1302, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Some aspects of the described subject matter may in some embodiments be implemented as computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular data structures in memory. The subject matter of this application may be practiced in a variety of system configurations, including hand-held devices, consumer electronics, general-purpose computers, more specialty computing devices, etc. The subject matter may also be practiced in distributed computing environments where tasks are performed by remote-processing devices that are linked through a communications network.

Communication Network Embodiments

In various example embodiments, one or more portions of the network 1320 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1320 or a portion of the network 1320 may include a wireless or cellular network, and the coupling 1324 may be a Code Division Multiple Access (CDMA) connection, a Global System for Mobile communications (GSM) connection, or another type of cellular or wireless coupling. In this example, the coupling 1324 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1308 and/or data generated by or received and processed by the instructions 1308 may be transmitted or received over the network 1320 using a transmission medium via a network interface device (e.g., a network interface component included in the communication components 1340) and utilizing any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1308 for execution by the machine 1300, and/or data generated by execution of the instructions 1308, and/or data to be operated on during execution of the instructions 1308, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS

- 100 computing apparatus
- 102 user
- 104 print-based media substrate
- 106 printed content
- 108 page
- 110 scanning device
- 112 paper feed device
- 114 light source
- 116 image capture device
- 118 page image
- 120 image processor
- 122 detected noise patterns
- 124 noise pattern classifier
- 126 classified detected noise patterns
- 128 neural network controller
- 130 sheet stack detected signal
- 132 user interface
- 134 sheet stack alert
- 136 measured page luminance
- 138 reference page luminance
- 140 no sheet stack detected signal
- 142 feedback
- 144 noise patterns
- 146 pixels
- 148 filter
- 200 routine
- 202 block
- 204 block
- 206 block
- 208 block
- 210 block
- 212 block
- 214 block
- 216 block
- 218 block
- 300 routine
- 302 block
- 304 block
- 306 block
- 308 block
- 310 block
- 312 block
- 314 block
- 316 block
- 400 training process
- 402 dataset of pages
- 404 sheet stack dataset
- 406 front sheet
- 408 back sheet
- 410 single sheet dataset
- 412 page properties
- 414 neural network model
- 416 prediction
- 418 ground truth
- 420 cross-entropy loss function
- 422 back-propagated prediction loss
- 500a single-sided single sheet page luminance and printed content patterns
- 500b sheet stack page luminance and printed content patterns
- 500c double-sided single sheet page luminance and printed content patterns
- 502 single sheet page luminance
- 504 printed content pattern
- 506 front paragraph luminance
- 508 consistent linear boundary parallel to a left edge of the page image
- 510 left paragraph alignment
- 512 portions of the printed content pattern
- 514 sheet stack page luminance
- 516 back paragraph luminance
- 518 consistent linear boundary parallel to a right edge of the page image
- 520 right paragraph alignment
- 522 other portions of the printed content pattern
- 600 exemplary luminosity thresholds
- 602 RGB values
- 604 maximum pixel luminosity
- 606 minimum pixel luminosity
- 608 default printed content threshold
- 610 default single sheet threshold
- 612 default back paragraph threshold
- 614 default front paragraph threshold
- 616 learned printed content threshold
- 618 learned single sheet threshold
- 620 learned back paragraph threshold
- 622 learned front paragraph threshold
- 624 noise 626 abnormal pixels
700 convolutional neural network
702 convolutional layer
704 input layer
706 output layer
800 convolutional neural network layers
802 tile
804 subregion of the input layer region
806 convolutional layer
808 convolutional layer subregion
900 VGG network
1000 VGG net
1002a convolution layer
1002b convolution layer
1002c convolution layer
1002d convolution layer
1004a RELU layer
1004b RELUlayer
1004c RELUlayer
1004d RELUlayer
1006a pooling layer
1006b pooling layer
1100 system
1102 network
1104 client device
1200 printer
1202 monitor or graphical user interface
1204 processor(s)
1206 output device(s)
1208 input device(s)
1210 volatile memory
1212 communication network interface
1214 nonvolatile memory
1216 communication network
1218 bus subsystem
1220 data processing system
1222 logic
1300 machine
1302 processors
1304 memory
1306 processor
1308 instructions
1310 processor
1312 main memory
1314 static memory
1316 storage unit
1318 machine-readable medium
1320 network
1322 devices
1324 coupling
1326 coupling
1328 output components
1330 input components
1332 biometric components
1334 motion components
1336 environmental components
1338 position components
1340 communication components
1342 I/O components
1344 bus Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" may be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the disclosure as claimed. The scope of disclosure subject matter is not limited to the depicted embodiments but is rather set forth in the following Claims.

What is claimed is:

1. A method, comprising:
    accepting at least one page of a print-based media substrate into a scanning device including a paper feed device;
    back-illuminating the at least one page using a light source;
    capturing a page image of the at least one page during back illumination using an image capture device;
    detecting noise patterns exhibited by the page image using an image processor;
    classifying detected noise patterns from the image processor using a noise pattern classifier;
    determining, using classified detected noise patterns and a neural network controller for a neural network model, whether the at least one page is a sheet stack based on the classified detected noise patterns, wherein the sheet stack comprises at least a front sheet and a back sheet stacked together and traversing the paper feed device concurrently, the front sheet obscuring printed content on the back sheet;
    on condition the neural network controller determines the at least one page is the sheet stack:
        transmitting a sheet stack detected signal from the neural network controller to the scanning device; and
        taking an action in view of the presence of the sheet stack detected signal.

2. The method of claim 1, further comprising, before the detecting of the noise patterns:
    determining a measured page luminance of the page image;
    comparing, using the image processor, the measured page luminance with a reference page luminance for the type of the print-based media substrate used for the at least one page;
    on condition the measured page luminance is less than or equal to the reference page luminance:
        transmitting a no sheet stack detected signal to the scanning device.

3. The method of claim 2, wherein determining the measured page luminance of the page image includes determining luminosity values for pixels of the page image.

4. The method of claim 3, wherein the neural network controller determines the at least one page is the sheet stack when the measured page luminance is below a learned single sheet threshold.

5. The method of claim 1, further comprising, before detecting the noise patterns:
    detecting noise exhibited by the page image using the image processor by applying a low pass filter to pixels in the page image;
    on condition the noise indicates the absence of abnormal pixels:
        transmitting a no sheet stack detected signal to the scanning device.

6. The method of claim 1, wherein the action is at least one of:
    creating a digital record indicating the presence of the sheet stack detected signal;
    physically marking the location of the sheet stack in the print-based media substrate;
    alerting a user of the presence of the sheet stack detected signal; and
    instructing the paper feed device to halt operation.

7. The method of claim 1, wherein the action is alerting a user of the presence of the sheet stack in the print-based media substrate, the method further comprising:
    verifying, by the user, that the sheet stack is actually present;
    on condition the sheet stack is not present:
        providing feedback of the lack of the sheet stack to the neural network controller; and
        updating the neural network model.

8. The method of claim 1, wherein detecting the noise patterns includes:
    identifying a printed content pattern comprising pixels of the page image having luminosity values below a default printed content threshold;
    analyzing the printed content pattern for at least one of:
        front paragraphs, wherein the front paragraphs comprise the pixels of the page image having luminosity values below a default front paragraph threshold;
        back paragraphs, wherein the back paragraphs comprise the pixels of the page image having luminosity values below a default back paragraph threshold that is higher than the default front paragraph threshold;

left paragraph alignment, wherein the left paragraph alignment is indicated by portions of the printed content pattern exhibiting a consistent linear boundary parallel to a left edge of the page image; and right paragraph alignment, wherein the right paragraph alignment is indicated by other portions of the printed content pattern exhibiting a consistent linear boundary parallel to a right edge of the page image.

9. The method of claim 8, wherein the neural network controller determines the at least one page is the sheet stack when the printed content pattern includes front paragraphs having the left paragraph alignment and back paragraphs having the left paragraph alignment.

10. A method comprising:
compiling a dataset of pages comprising:
single sheets, wherein the single sheets include at least one of single-sided single sheets printed on one side and double-sided single sheets printed on both sides; and
sheet stacks, wherein the sheet stacks each comprise at least a front sheet and a back sheet stacked together to be fed to a paper feed device concurrently, the front sheet obscuring printed content on the back sheet;
wherein the single sheets and the sheet stacks are randomly distributed among the dataset of pages;
feeding the dataset of pages to the paper feed device, wherein the paper feed device is connected to a light source, an image capture device, and a neural network controller;
back-illuminating each of the dataset of pages using the light source;
capturing a page image of each of the dataset of pages during back illumination using the image capture device;
detecting page properties exhibited by each of the dataset of pages using the neural network controller;
predicting, using the neural network controller, whether each of the dataset of pages is one of the single sheets or one of the sheet stacks based on the page properties;
calculating a prediction loss using a cross-entropy loss function; and
back-propagating the prediction loss to the neural network controller to train the neural network controller to minimize the prediction loss.

11. The method of claim 10, wherein detecting the page properties includes determining a page luminance based on luminosity values for pixels of the page image.

12. The method of claim 11, wherein the neural network controller determines the at least one page is a sheet stack when the page luminance is below a default single sheet threshold and minimizing the prediction loss after back-propagation includes adjusting the default single sheet threshold to create a learned single sheet threshold.

13. The method of claim 10, wherein detecting the page properties includes:
identifying a printed content pattern comprising pixels of the page image having luminosity values below a default printed content threshold;
analyzing the printed content pattern for at least one of:
front paragraphs, wherein the front paragraphs comprise the pixels of the page image having luminosity values below a default front paragraph threshold;
back paragraphs, wherein the back paragraphs comprise the pixels of the page image having luminosity values below a default back paragraph threshold that is higher than the default front paragraph threshold;

left paragraph alignment, wherein the left paragraph alignment is indicated by portions of the printed content pattern exhibiting a consistent linear boundary parallel to a left edge of the page image; and right paragraph alignment, wherein the right paragraph alignment is indicated by other portions of the printed content pattern exhibiting a consistent linear boundary parallel to a right edge of the page image.

14. The method of claim 13, wherein the neural network controller determines the at least one page is a sheet stack when the printed content pattern includes front paragraphs having the left paragraph alignment and back paragraphs having the left paragraph alignment, minimizing the prediction loss after back-propagation includes adjusting the default front paragraph threshold to create a learned front paragraph threshold, and minimizing the prediction loss after back-propagation includes adjusting the default back paragraph threshold to create a learned back paragraph threshold.

15. A computing apparatus comprising:
a scanning device including a paper feed device;
a light source;
an image capture device;
a neural network controller; and
a memory storing instructions that, when executed by the processor, configure the apparatus to:
accept at least one page of a print-based media substrate into the scanning device including the paper feed device;
back-illuminate the at least one page using the light source;
capture a page image of the at least one page during back illumination using the image capture device;
detect noise patterns exhibited by the page image using an image processor;
classify detected noise patterns from the image processor using a noise pattern classifier;
determine, using classified detected noise patterns and the neural network controller for a neural network model, whether the at least one page is a sheet stack based on the classified detected noise patterns, wherein the sheet stack comprises at least a front sheet and a back sheet stacked together and traversing the paper feed device concurrently, the front sheet obscuring printed content on the back sheet;
on condition the neural network controller determines the at least one page is the sheet stack:
transmit a sheet stack detected signal from the neural network controller to the scanning device; and
take an action in view of the presence of the sheet stack detected signal.

16. The computing apparatus of claim 15, wherein the instructions further configure the apparatus to, before the detect the noise patterns:
determine a measured page luminance of the page image;
compare, using the image processor, the measured page luminance with a reference page luminance for the type of the print-based media substrate used for the at least one page;
on condition the measured page luminance is less than or equal to the reference page luminance:
transmit a no sheet stack detected signal to the scanning device.

17. The computing apparatus of claim 15, wherein detecting the noise patterns includes:

identify a printed content pattern comprising pixels of the page image having luminosity values below a default printed content threshold;

analyze the printed content pattern for at least one of:

front paragraphs, wherein the front paragraphs comprise the pixels of the page image having luminosity values below a default front paragraph threshold;

back paragraphs, wherein the back paragraphs comprise the pixels of the page image having luminosity values below a default back paragraph threshold that is higher than the default front paragraph threshold;

left paragraph alignment, wherein the left paragraph alignment is indicated by portions of the printed content pattern exhibit a consistent linear boundary parallel to a left edge of the page image; and right paragraph alignment, wherein the right paragraph alignment is indicated by other portions of the printed content pattern exhibit a consistent linear boundary parallel to a right edge of the page image.

18. The computing apparatus of claim 15, the neural network controller having undergone a training process with instructions including:

compile a dataset of pages comprising:

single sheets, wherein the single sheets include at least one of single-sided single sheets printed on one side and double-sided single sheets printed on both sides; and sheet stacks, wherein the sheet stacks each comprise at least the front sheet and the back sheet stacked together to be fed to the paper feed device concurrently, the front sheet obscure printed content on the back sheet;

wherein the single sheets and the sheet stacks are randomly distributed among the dataset of pages;

feed the dataset of pages to the paper feed device, wherein the paper feed device is connected to the light source, the image capture device, and the neural network controller;

back-illuminate each of the dataset of pages using the light source;

capture the page image of each of the dataset of pages during back illumination using the image capture device;

detect page properties exhibited by each of the dataset of pages using the neural network controller;

predict, using the neural network controller, whether each of the dataset of pages is one of the single sheets or one of the sheet stacks based on the page properties;

calculate a prediction loss using a cross-entropy loss function; and back-propagate the prediction loss to the neural network controller to train the neural network controller to minimize the prediction loss.

19. The computing apparatus of claim 15, wherein detecting the page properties instructions include:

identify a printed content pattern comprising pixels of the page image having luminosity values below a default printed content threshold;

analyze the printed content pattern for at least one of:

front paragraphs, wherein the front paragraphs comprise the pixels of the page image having luminosity values below a default front paragraph threshold;

back paragraphs, wherein the back paragraphs comprise the pixels of the page image having luminosity values below a default back paragraph threshold that is higher than the default front paragraph threshold;

left paragraph alignment, wherein the left paragraph alignment is indicated by portions of the printed content pattern exhibit a consistent linear boundary parallel to a left edge of the page image; and right paragraph alignment, wherein the right paragraph alignment is indicated by other portions of the printed content pattern exhibit a consistent linear boundary parallel to a right edge of the page image.

20. The computing apparatus of claim 19, wherein the neural network controller determines the at least one page is the sheet stack when the printed content pattern includes front paragraphs having the left paragraph alignment and back paragraphs having the left paragraph alignment.

* * * * *